(12) United States Patent
Fukamizu et al.

(10) Patent No.: US 7,023,157 B2
(45) Date of Patent: Apr. 4, 2006

(54) STEPPING MOTOR DRIVE DEVICE AND METHOD

(75) Inventors: Shingo Fukamizu, Takatsuki (JP); Katsuhiro Onishi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/971,097

(22) Filed: Oct. 25, 2004

(65) Prior Publication Data

US 2005/0146303 A1 Jul. 7, 2005

(30) Foreign Application Priority Data

Dec. 19, 2003 (JP) ............................. 2003-423800

(51) Int. Cl.
*H02P 7/04* (2006.01)
(52) U.S. Cl. .................. 318/368; 318/599; 318/801; 318/685; 318/696
(58) Field of Classification Search ................ 318/368, 318/685, 696, 138, 801, 807, 808, 599, 560, 318/567, 569, 268, 438, 722
See application file for complete search history.

(56) References Cited

U.S. PATENT DOCUMENTS

2004/0000884 A1* 1/2004 Inao et al. .................. 318/254
2004/0080333 A1* 4/2004 Klein .......................... 324/772

FOREIGN PATENT DOCUMENTS

JP 6-343295 12/1994

* cited by examiner

*Primary Examiner*—Karen Masih
(74) *Attorney, Agent, or Firm*—McDermott Will & Emery LLP

(57) ABSTRACT

The reference signal generation unit 110a integrates, in the integration circuit 3, a staircase signal generated by the staircase generation unit 2, and thereby generates a reference signal VCTA whose signal level changes continuously over time, and which represents a limit value for the supply current. According to the control of the PWM control unit 120a, the bridge rectification circuit 130a maintains the coil supply current at the limit value, using a current chopper method. Additionally, when the current supply is stopped, the bridge rectification circuit 130a performs synchronous rectification, where the transistors 10 and 12 are brought into conduction, and a regenerative current is circulated in a closed circuit formed with the coil 19a. When the reference signal VCTA decreases relatively fast, the synchronous rectification prohibition unit 115a prohibits one of the transistors 10 and 12 from being brought into conduction when the current supply is stopped.

18 Claims, 33 Drawing Sheets

AT A HIGH FREQUENCY

AT A LOW FREQUENCY

PATH A

PATH B

PATH C

INPUT OFFSET VOLTAGE = I×R

INPUT OFFSET VOLTAGE = I × $\frac{R_1+R_2}{R_1 \times R_2}$

M1~M8 : MOS TRANSISTORS

THE OPERATIONAL AMPLIFIER IS PRODUCED SO THAT EACH MOS TRANSISTOR SATISFIES THE FOLLOWING RELATIONAL EXPRESSION:

$$\frac{(W/L)_3}{(W/L)_6} = \frac{(W/L)_4}{(W/L)_6} = K\frac{(W/L)_5}{(W/L)_7}$$

WHERE $(W/L)_i$ : $M_i$ (GATE CHANNEL WIDTH / GATE CHANNEL LENGTH) OF ith TRANSISTOR $K = \frac{1}{2}$, THEN OFFSET VOLTAGE = 0

$1 \leq K \leq 2$, THEN OFFSET VOLTAGE > 0

STEPPING MOTOR DRIVE DEVICE AND METHOD

BACKGROUND OF THE INVENTION

[1] Field of the Invention

The present invention relates to a stepping motor drive device, in particular to a technology for driving a stepping motor with low noise and low vibration.

[2] Description of the Related Art

Late years, stepping motors are used in image capturing electronics devices, such as a DSC (Digital Still Camera) and a DVC (Digital Video Camera), as optical system actuators for adjusting aperture, focus, zoom and so on.

Stepping motors, especially those used for image capturing electronics devices, are required to operate with low noise and low vibration. This is because sounds generated by a stepping motor are caught by a built-in microphone of the electronics device and recorded as noise, while vibrations generated by a stepping motor cause image blurring and result in degradation of the recorded image.

In response to such a demand, a drive technology for stepping motor operations with low noise and low vibration has been disclosed, for instance, by Japanese Laid-Open Patent Application No. H06-343295.

FIG. 33 is a drive device disclosed by this publication. The following description will focus only on components necessary for explaining the principle of the drive device.

In FIG. 33, reference numeral 20 denotes a stepping motor that is a controlled object, reference numeral 45 is a rotor, and reference numerals 19a and 19b are a first coil and a second coil, respectively.

An up-down counter 43a counts up or down a clock signal CLKP according to an up-down signal DA, and provides a 4-bit signal DA1–DA4, which indicates the counted value, to a D/A converter 44a.

The D/A converter 44a outputs a voltage signal VCA corresponding to the 4-bit signal DA1–DA4. The voltage signal VCA is a staircase waveform that increases and decreases stepwise. The rate of change in the voltage signal VCA can be altered depending on the pulse frequency of clock signal CLKP and the step height of voltage signal VCA, and accelerates as the pulse frequency of clock signal CLKP becomes higher, or the step height of voltage signal VCA becomes larger. In addition, the voltage signal VCA can be maintained constant by stopping the clock signal CLKP.

In a voltage drive circuit 39a, the voltage signal VCA is amplified by a non-inverting power amplifier 41a, and also by an inverting power amplifier 42a. Thus, the first coil 19a which is connected between output terminals of the power amplifiers 41a and 42a is driven by the application of a voltage.

The components similar to ones for the first coil 19a above are provided for the second coil 19b, and the same operations are performed in order to drive the second coil 19b by applying the staircase voltage.

According to this configuration, the applied voltage increases stepwise at the start of the period for current supply to the coil, while the applied voltage decreases stepwise when the supply is stopped. Herewith, vibration and noise induced by abrupt torque fluctuations at the start and stop of current supply are reduced.

However, as to the drive device of the related art above, the attenuation of the coil current at the time when the staircase signal is decreasing is slow, and therefore the coil current poorly follows the staircase signal. The same is true if for instance a staircase signal approximating a sine wave (hereinafter, referred to simply as 'an approximate sinusoidal staircase signal') is used, with a view to reducing vibration and noise of the stepping motor. The coil current does not exactly follow the approximate sinusoidal staircase signal. As a result, this presents the first problem that an intended reduction in vibration and noise cannot be obtained.

This is a serious problem particularly when the stepping motor is applied to image capturing electronics devices, and thus there is still a demand for further reduction in noise and vibration of the stepping motor operations.

In addition, there is a second problem that the drive device of the above related art requires a considerable amount of power since the coil current is continuously supplied.

SUMMARY OF THE INVENTION

In view of the above problems, a first object of the present invention is to provide a drive device that reduces the noise and vibration caused by the operations of a stepping motor, the driven unit of the device.

Additionally, a second object of the present invention is to provide a drive device which reduces power required to drive the stepping motor.

In order to solve the above-described problems, the stepping motor drive device of the present invention comprises: a supply current measurement unit operable to measure a supply current supplied to a coil of a stepping motor; a reference signal generation unit operable to generate a reference signal whose signal level changes continuously over time and which represents a limit value for the supply current; a chopper unit operable to pass the supply current in a conducting state through thereof and stop the supply current in a non-conducting state; a PWM control unit operable to (i) bring the chopper unit into the conducting state in a predetermined cycle, and (ii) when in each cycle the measured supply current exceeds the limit value, bring the chopper unit into the non-conducting state; a synchronous rectification unit operable to form, in a conducting state, a closed circuit together with the coil; a synchronous rectification control unit operable to bring, during a time period when the chopper unit is in the non-conducting state, the synchronous rectification unit into the conducting state so as to make a regenerative current from the coil circulate in the closed circuit; and a synchronous rectification prohibition unit operable to prohibit, for at least a portion of a time period during which the limit value is decreasing, the synchronous rectification control unit from bringing the synchronous rectification unit into the conducting state.

Here, the reference signal generation unit may comprise: a staircase generation unit operable to generate a staircase signal; and an integration circuit operable to generate the reference signal by integrating the staircase signal.

Here, the stepping motor drive device may further comprise: a bridge rectification circuit which includes the chopper unit, the synchronous rectification unit, and a plurality of switching units, and is operable to rectify the supply current; and a reference direction control unit operable to reverse a reference direction in which the supply current is to be managed, by bringing each of the switching units in the bridge rectification circuit into a predetermined state that is one of the conducting state and the non-conducting state.

Here, the supply current measurement unit may be a resistor connected in series with the coil and measure the supply current using a voltage appearing across the resistor.

Here, the resistor may be a semiconductor element in the conducting state.

Here, the stepping motor may have a plurality of coils corresponding one-to-one with a plurality of phases, wherein the supply current measurement unit measures the supply current for each of the plurality of coils, the reference signal generation unit generates the reference signal for each of the plurality of coils, the chopper unit is provided for each of the plurality of coils, and passes the supply current to each of the coils in the conducting state and stops the supply current to each of the coils in the non-conducting state, the PWM control unit, for each of the plurality of coils, (i) brings the corresponding chopper unit into the conducting state in the predetermined cycle, and (ii) when in each cycle the measured supply current exceeds the limit value, brings the corresponding chopper unit into the non-conducting state, the synchronous rectification unit is provided for each of the plurality of coils and forms individual closed circuits together with the corresponding coils in the conducting state, the synchronous rectification control unit controls, for each of the plurality of coils, the corresponding synchronous rectification unit so as to make the regenerative current from the coil circulate in the corresponding closed circuit, and the synchronous rectification prohibition unit prohibits, for each of the plurality of coils, the corresponding synchronous rectification control unit from bringing the corresponding synchronous rectification unit into the conducting state.

ADVANTAGEOUS EFFECTS OF THE INVENTION

In a stepping motor drive device with the above configurations, the supply current is controlled to a target value represented by the reference signal whose signal level changes continuously over time. Hence, compared to the prior art in which the target value for the current supply control is represented by a staircase signal, vibration and noise, induced by torque fluctuations at a time of stepwise increase and decrease in the target value, are eliminated.

Furthermore, in order to achieve an adequate reduction in vibration and noise, the coil current is controlled according to a limit value for the supply current represented by, for instance, an approximate sinusoidal staircase signal. In this case, by prohibiting the synchronous rectification, the coil current is brought to decay rapidly during a period when the reference signal is decreasing at a relatively rapid rate. Herewith, the coil current follows the limit value closely. In the time other than the above period, on the other hand, the power supply efficiency is enhanced by carrying out the synchronous rectification and thereby mitigating decay of the coil current.

Thus, providing implementation and prohibition periods of the synchronous rectification according to the decreasing rate of the reference signal allows to achieve a reduction in vibration and noise as well as a good efficiency in the power supply.

In addition, the stepping motor drive device of the present invention exercises a PWM control on the supply current supplied to the coil, using a current chopper method. This achieves lower power operation compared to the case where the current is supplied to the coil by voltage control.

Here, the integration circuit may generate the reference signal which follows an average gradient of the staircase signal by integrating the staircase signal using a time constant corresponding to a rate of change in levels of the staircase signal.

Here, the integration circuit may acquire a change rate signal indicating the rate of change in the levels of the staircase signal, and determine the time constant according to the change rate signal.

Here, the staircase generation unit may generate the staircase signal by counting a pulse signal which provides one pulse per step of the staircase signal, wherein the stepping motor drive device further comprises a discrimination unit operable to discriminate a pulse frequency of the pulse signal, and the integration circuit determines the time constant based on a result of the discrimination.

According to the above configurations, smooth reference signals are generated so as to follow respective staircase signals, each of which changes at a different rate of speed. As a result, a reduction in vibration and noise can be achieved for various rotational frequencies of the stepping motor.

Here, the stepping motor drive device may further comprise a receiving unit operable to receive a data signal which indicates a level of each step of the staircase signal, wherein the staircase generation unit generates the staircase signal by digital-to-analog converting the received data signal within a time period corresponding to each step.

According to this configuration, a staircase signal approximating any waveform is generated based on the data signal. In particular, using an approximate sinusoidal staircase signal makes an eminent effect on a reduction in vibration and noise.

Here, the reference direction may be indicated by a polarity signal, wherein the stepping motor drive device further comprises a timing adjustment unit operable to delay the polarity signal for a time period required for the limit value to decrease by a predetermined amount and the reference direction control unit reverses the reference direction according to the delayed polarity signal.

This configuration has a positive effect in the case where the polarity signal reverses its phase when the limit value, represented by the reference signal, has not yet come sufficiently close to zero. In the above configuration, the reference direction is not reversed until a time period required for the limit value to come sufficiently close to zero after the phase reversal of the polarity signal has elapsed. Herewith, the ripple factor of the coil current can be reduced, compared to the case in which the reference direction is reversed immediately after the phase reversal of the polarity signal. As a result, vibration and noise induced when the motor is driven can be adequately reduced.

Here, the reference signal generation unit may comprise: a staircase generation unit operable to generate a staircase signal; and an integration circuit operable to generate the reference signal by integrating the staircase signal, wherein the PWM control unit maintains the chopper unit in the non-conducting state during a time period when the level of the staircase signal is zero.

This configuration does not only achieve the effects described above, but also enhances the power supply efficiency since the current supply to the coil is completely stopped during a period when the reference signal is zero.

Here, the supply current measurement unit may output a measurement result which is obtained by adding a positive offset to the measured supply current, wherein the PWM control unit (i) brings the chopper unit into the conducting state in the predetermined cycle, and (ii) when in each cycle the measurement result exceeds the limit value, brings the chopper unit into the non-conducting state.

There has been a problem that an output from the supply current measurement unit is not obtained for the coil current less than a predetermined current level, and therefore the coil current cannot be controlled to be less than the predetermined current level. The above configuration eliminates this problem even under the worst conditions in individual differences among the supply current measurement units and temperature variation. Namely, the coil current can be properly controlled to the limit value represented by the reference signal until it reaches zero. As a result, a drop in the coil current occurring when the reference direction reverses, which results in the ripple factor, is eradicated and consequently vibration and noise induced when the motor is driven can be adequately reduced.

In order to solve the above-described problems, a stepping motor drive method for a drive device having a synchronous rectification unit which forms, in a conducting state, a closed circuit together with a coil included in a stepping motor comprises the steps of: (a) measuring a supply current to the coil; (b) generating a reference signal whose signal level changes continuously over time and which represents a limit value for the supply current; (c) starting the supply current to flow to the coil in a predetermined cycle and stopping the supply current when in each cycle the measured supply current exceeds the limit value; (d) bringing the synchronous rectification unit into a conducting state while the supply current is stopped so as to make a regenerative current from the coil circulate in the closed circuit; and (e) prohibiting the synchronous rectification unit, for at least a portion of a time period during which the limit value is decreasing, from being brought into the conducting state in the step (d).

Here, the step (b) may comprise: a staircase generation sub-step of generating a staircase signal; and an integration sub-step of generating the reference signal by integrating the staircase signal.

Here, the integration sub-step may generate the reference signal which follows an average gradient of the staircase signal by integrating the staircase signal using a time constant corresponding to a rate of change in levels of the staircase signal.

Here, the stepping motor drive method may further comprise the steps of: (f) acquiring a polarity signal which indicates a reference direction in which the supply current is to be managed; (g) delaying the polarity signal for a time period required for the limit value to decrease by a predetermined amount; and (h) reversing the reference direction according to the delayed polarity signal.

Here, the step (a) may comprise: an offset adding sub-step of adding a positive offset to the measured supply current, wherein the step (a) takes, as a measurement result, the supply current to which the positive offset has been added, and the step (c) starts the supply current to flow to the coil in the predetermined cycle and stops the supply current when in each cycle the measurement result exceeds the limit value.

Driving a stepping motor according to these methods can achieve the same effects as described for the drive device.

BRIEF DESCRIPTION OF THE DRAWINGS

These and the other objects, advantages and features of the invention will become apparent from the following description thereof taken in conjunction with the accompanying drawings which illustrate specific embodiments of the invention.

In the drawings.

DESCRIPTION OF THE PREFERRED EMBODIMENT

The stepping motor drive device according to the embodiments of the present invention is described with reference to the drawings.

1. First Embodiment

A stepping motor drive device of the first embodiment of the present invention generates a reference signal whose signal level changes continuously over time. The level of the reference signal represents a limit value for the supply current. Here, 'a signal whose level changes continuously over time' means that the signal does not have abrupt, stepwise changes in the signal level. Examples of such signals are a sine wave signal, a triangular wave signal whose rises and falls are inclined, and a trapezoidal wave signal.

The stepping motor drive device exercises PWM (Pulse Width Modulation) control on a current supplied to the motor coil, according to the limit value represented by the generated reference signal. More specifically, the PWM control is executed using a current chopper method.

In addition, the stepping motor drive device implements synchronous rectification. In this rectification process, a switch for the synchronous rectification is brought into conduction and forms a closed circuit together with the motor coil during the period when the current supply to the motor coil is stopped. In this closed circuit, a regenerative current out of the motor coil is circulated through the switch. However, the switch drops out of conduction at least for a period of time when the limit value represented by the reference signal is decreasing, and the regenerative current out of the motor coil is circulated through a flywheel diode connected in parallel with the switch. In short, the synchronous rectification is prohibited during the time period.

The following explains the details of the stepping motor drive device with reference to drawings.

1.1 Overall Configuration

Figure 1:
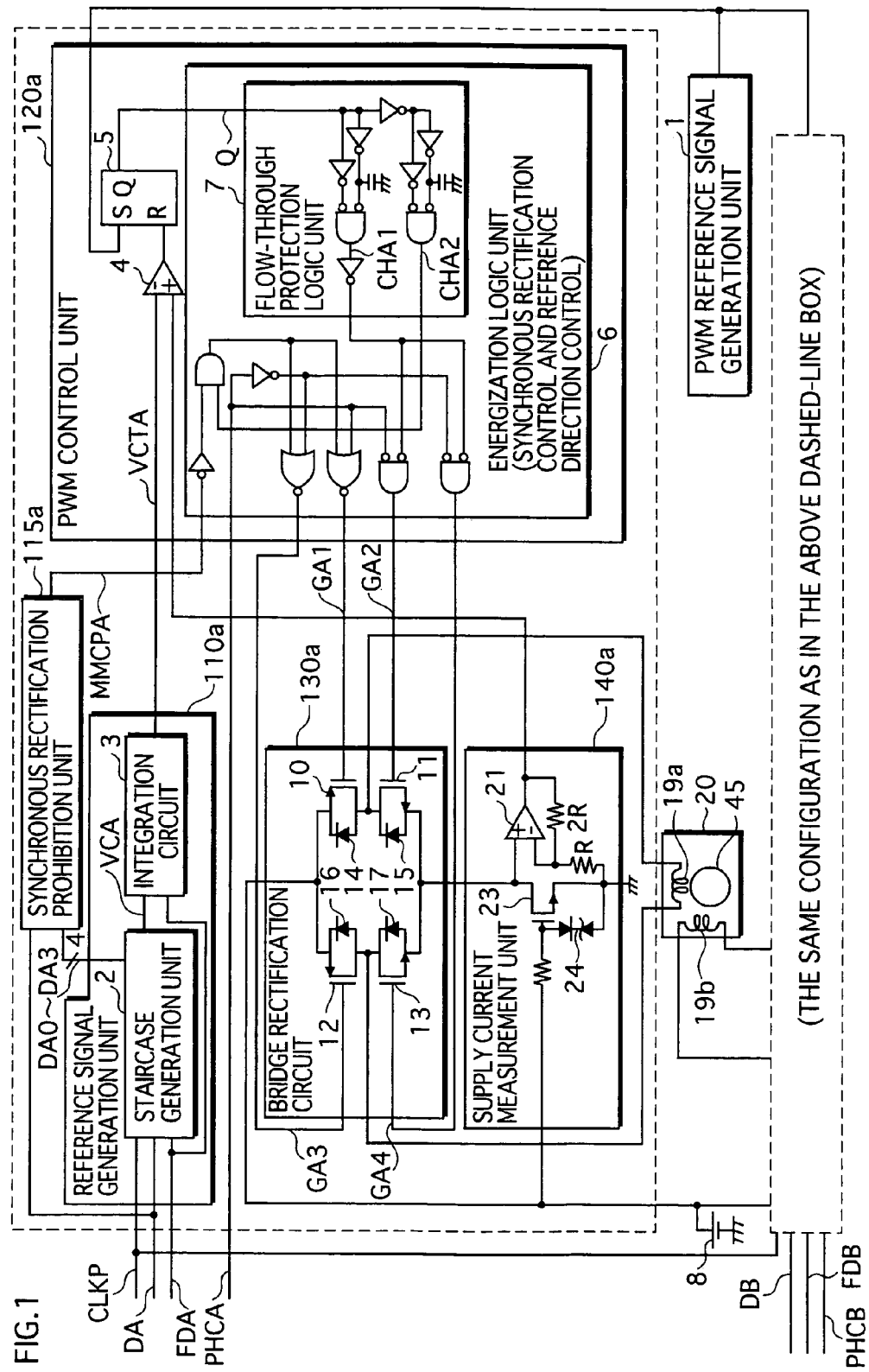
FIG. 1 is a functional block diagram showing a configuration of a stepping motor drive device according to the first embodiment.

FIG. 1 is a functional block diagram showing an overall configuration of the stepping motor drive device. Note that a stepping motor, the driven unit of the device, is also shown in the figure.

In FIG. 1, reference numeral 20 denotes a stepping motor, reference numeral 45 is a rotor, and reference numerals 19a and 19b are a first coil and a second coil, each corresponding to a different phase.

The stepping motor drive device is composed of: a PWM reference signal generation unit 1, a reference signal generation unit 110a, a synchronous rectification prohibition unit (hereafter, 'SR prohibition unit') 115a, a PWM control unit 120a, a bridge rectification circuit 130a, a supply current measurement unit 140a, and a power supply 8.

Since the same components are provided for respective coils, the following description presents components of the first coil as a representative example.

The reference signal generation unit 110a comprises a staircase generation unit 2 and an integration circuit 3. The PWM control unit 120a comprises a comparator 4, a flip-flop 5, and an energization logic unit 6. Included in this energization logic unit 6 is a flow-through protection logic unit 7. The bridge rectification circuit 130a comprises MOSFETs (Metal Oxide Semiconductor Field Effect Transistors, hereinafter simply 'transistors') 10 to 13 and flywheel diodes 14 to 17.

The energization logic unit 6 functions as the synchronous rectification control unit as well as the reference direction control unit cited in the claims of this application. By sending predetermined gate signals to the bridge rectification circuit 130a, the energization logic unit 6 controls a direction of a reference current (hereinafter, 'a reference direction') for managing the synchronous rectification and the supply current.

When a current is being supplied to the coil 19a, one of the transistors 11 and 13 whichever corresponds to the reference direction chops the supply current according to the gate signals sent from the energization logic unit 6. Here, the transistors 11 and 13 are the chopper units cited in the claims. In a regenerative period, both transistors 10 and 12 are brought into conduction, and the regenerative current out of the coil 19a is controlled under the synchronous rectification. Alternatively, one of the transistors 10 and 12 goes into conduction while the other is brought into non-conduction, and the regenerative current is circulated through the flywheel diode which is connected in parallel with the transistor in the non-conducting state.

The supply current measurement unit 140a includes an ON resistance adjustment circuit 24, a transistor 23, and an amplifier 21.

1.2 Staircase Generation Unit 2

Figure 2:
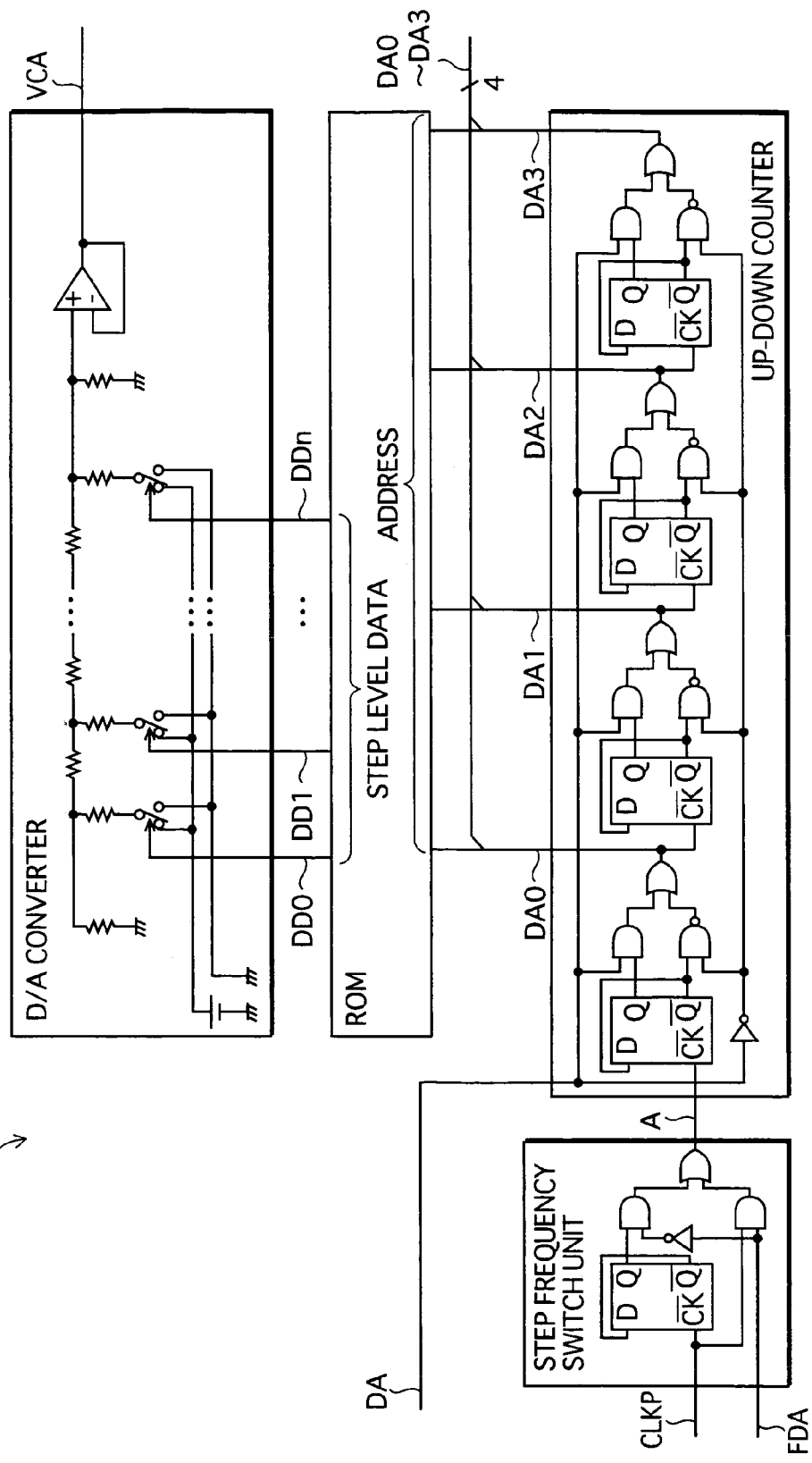
FIG. 2 is a functional block diagram showing a configuration of a staircase generation unit.

FIG. 2 is a functional block diagram showing a detailed configuration of the staircase generation unit 2. As determined by a change rate signal FDA, a change rate switch unit chooses between a clock signal CLKP and a signal obtained by dividing the clock signal CLKP by two. The change rate switch unit sends the chosen signal to an up-down counter as a signal CP which provides one pulse per step of the staircase signal.

The up-down counter counts up or down the signal CP according to an up-down signal DA, and outputs a count value DA0–DA3 to a ROM (Read Only Memory). The ROM stores data indicating, for example, each step level of an approximate sinusoidal staircase signal in advance, and outputs to a D/A converter the step level data DD0, DD1, . . . , DDn which is identified by the count value DA0–DA3 of the up-down counter. The D/A converter converts this step level data into an analog voltage, and outputs it as an approximate sinusoidal staircase signal VCA.

Since the up-down counter, the ROM, and the D/A converter are all common, well-known circuits, their detailed explanation is omitted here.

Figure 3:
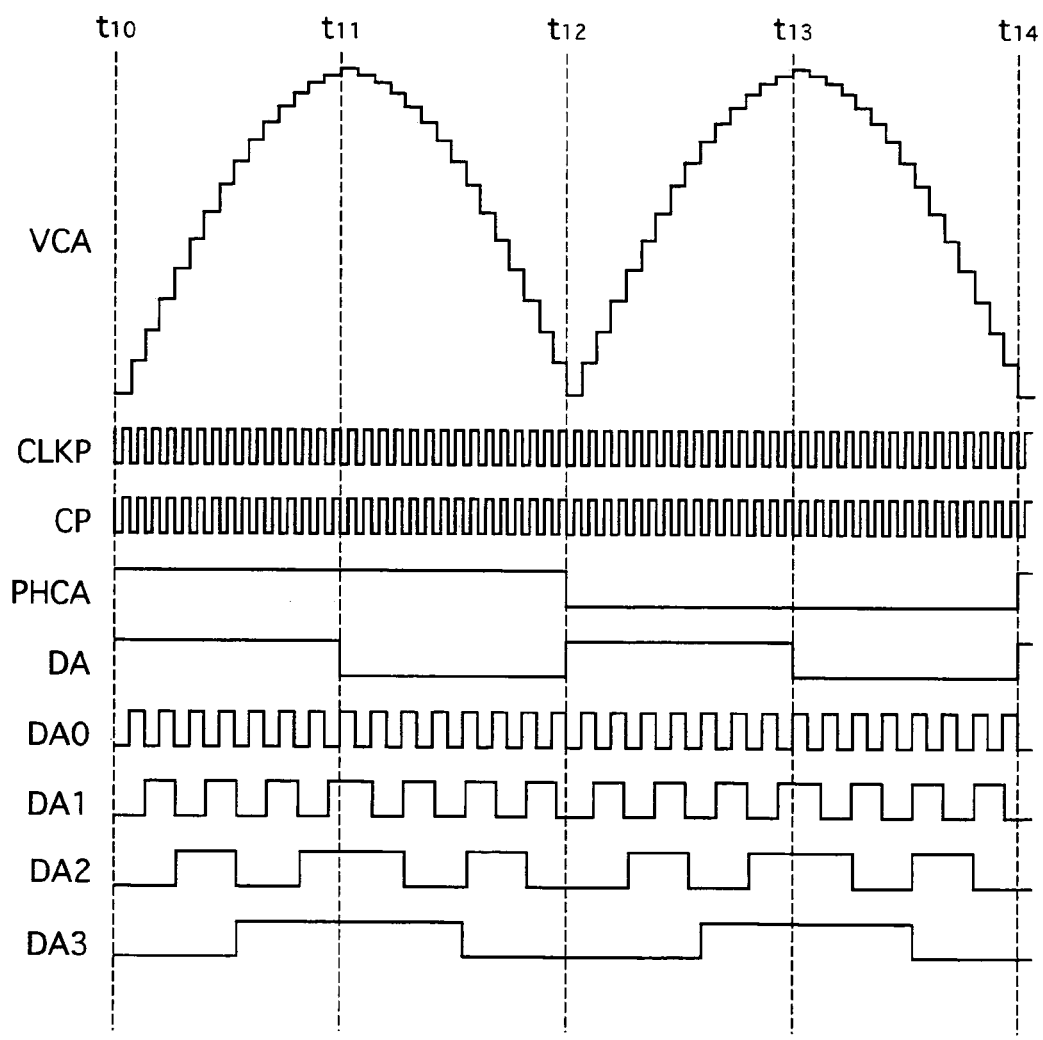
FIG. 3 is a waveform chart illustrating time changes of main signals in the staircase generation unit.

FIG. 3 is a waveform chart showing time changes of main signals in the staircase generation unit 2, and illustrates the case in which the level of the change rate signal FDA (not shown) is high by an example.

From time t10 to time t11, the clock signal CLKP, a high-level polarity signal PHCA, and a high-level up-down signal DA are provided. According to these signals, the up-down counter outputs the count value DA0–DA3 which increases from 0 to 15. The D/A converter digital-to-analog converts the step level data DD0–DDn read out from the ROM, and thereby generates one-fourth cycle of the approximate sinusoidal staircase signal VCA.

From time t11 to time t12, a low-level up-down signal DA is provided. The up-down counter outputs the count value DA0–DA3 which decreases from 15 to 0. The D/A converter generates the next fourth cycle of the approximate sinusoidal staircase signal VCA.

At time t12, as soon as the count value DA0–DA3 reaches zero, the polarity signal PHCA switches to a low level.

From time t12 to t14, the rest of the cycle (i.e. the second half cycle) of the approximate sinusoidal staircase signal VCA is generated while the polarity signal PHCA is kept at the low level.

Note here that, when the level of the change rate signal FDA is low, the signal CP will be a signal obtained by dividing the clock signal CLKP by two. In this case, the generated approximate sinusoidal staircase signal VCA has half the frequency of the one illustrated in FIG. 3. Here, the polarity signal PHCA and up-down signal DA shall be respectively adjusted in advance so that each has an appropriate frequency, and then provided.

1.3 Integration Circuit 3

Figure 4:
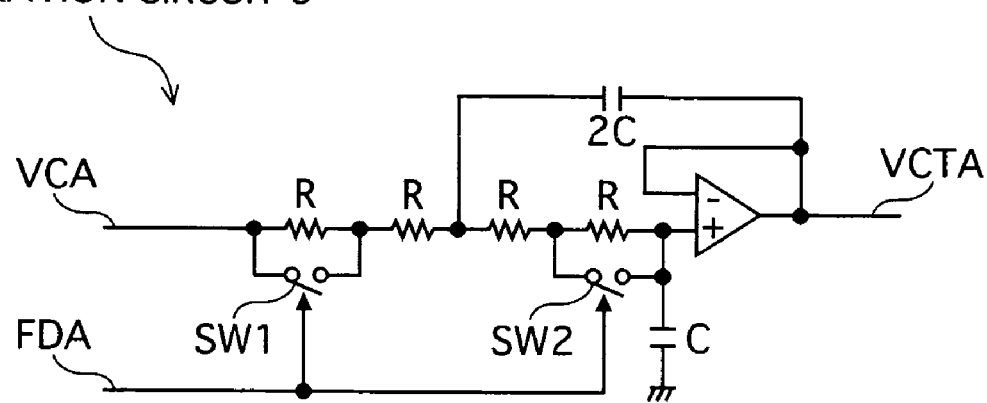
FIG. 4 is a functional block diagram showing a configuration of an integration circuit.

FIG. 4 is a circuit diagram showing a detailed configuration of the integration circuit 3. This circuit is well known as a Butterworth low-pass filter. The integration circuit 3 integrates the staircase signal VCA using a time constant corresponding to the change rate signal FDA, in order to output a reference signal VCTA which follows the average gradient of the staircase signal VCA.

For this purpose, switches SW1 and SW2 controlled by the change rate signal FDA are provided so as to adjust resistance that determines the time constant.

Figure 5A:
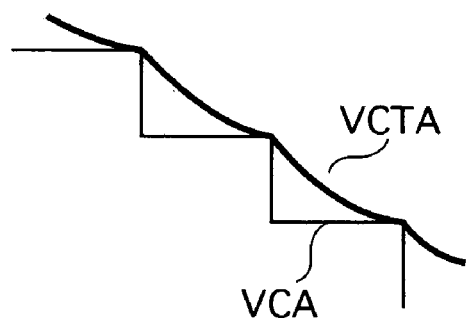
FIGS. 5A and 5B are conceptual diagrams showing that reference signals each following a staircase signal having a different rate of speed can be obtained as determined by a time constant.
Figure 5B:
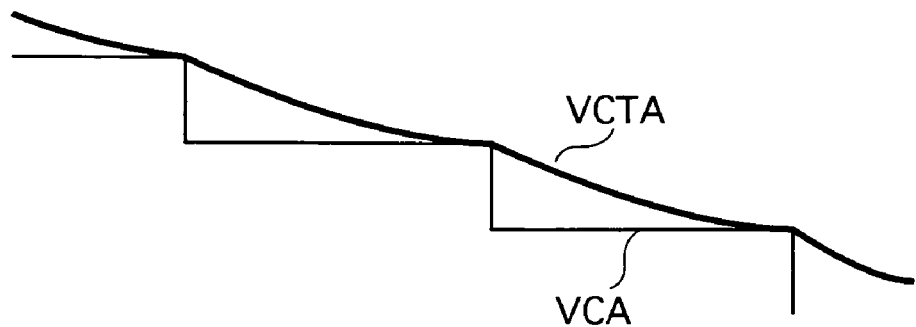

FIGS. 5A and 5B are conceptual diagrams showing that reference signals VCTA each following a staircase signal VCA having a different change rate can be obtained as determined by the time constant.

A high-level change rate signal FDA indicates that the staircase signal VCA increases and decreases at a high frequency. When this high-level change rate signal FDA is provided, the switches SW1 and SW2 are shorted. Thereby, the resistance is set low, and therefore the time constant is set short. FIG. 5A shows that, in such a case, a reference signal VCTA is generated which follows the average gradient of the staircase signal VCA increasing and decreasing at a high frequency.

A low-level change rate signal FDA indicates that the staircase signal VCA increases and decreases at a low frequency. When this low-level change rate signal FDA is provided, the switches SW1 and SW2 are opened. Thereby, the resistance is set high, and therefore the time constant is set long. FIG. 5B shows that, in such a case, a reference signal VCTA is generated which follows the average gradient of the staircase signal VCA increasing and decreasing at a low frequency.

The reference signal VCTA generated in the above manner has a continuous level change, and does not any longer have abrupt and stepwise changes as seen in the staircase signal VCA.

1.4 SR Prohibition unit 115a

Figure 6:
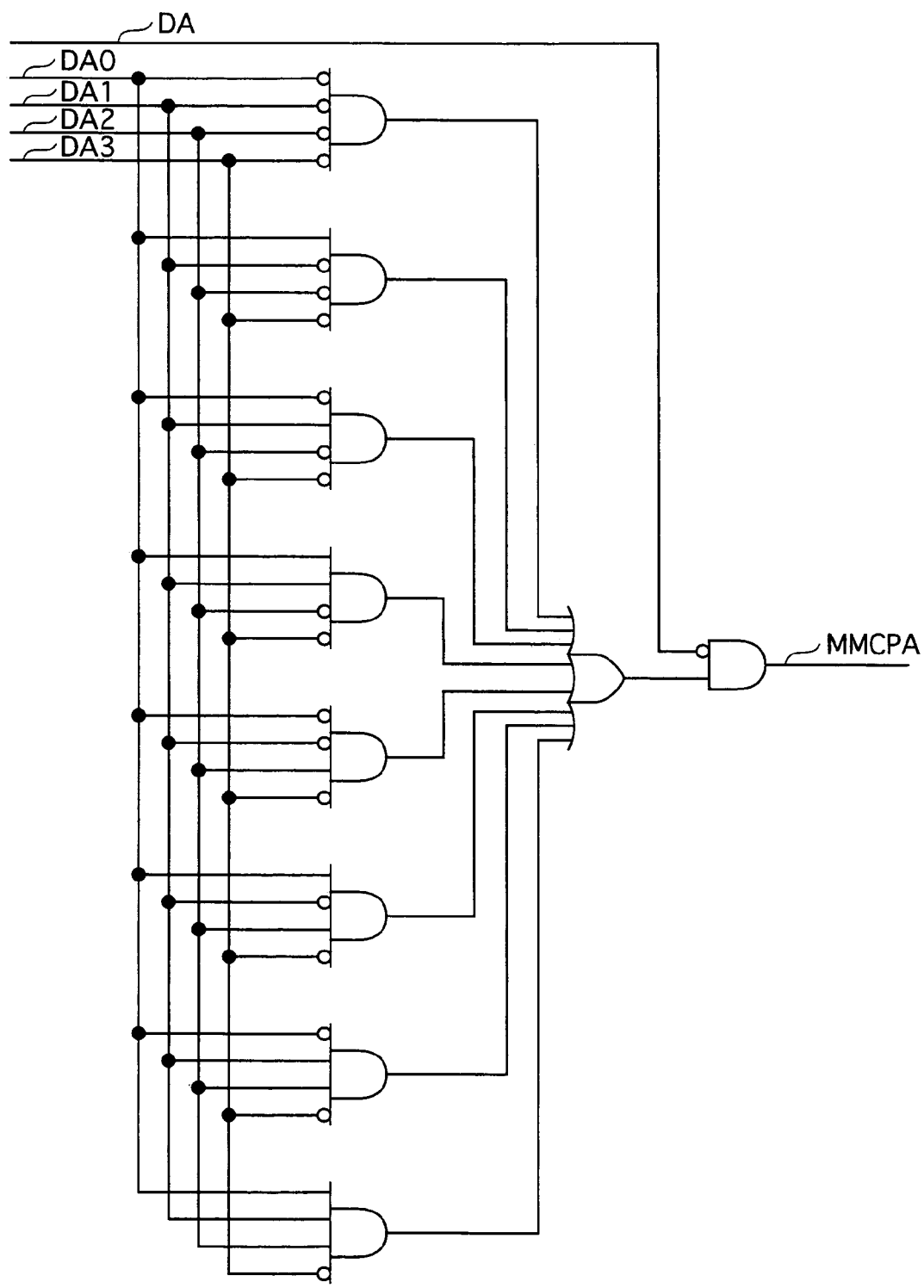
FIG. 6 is a functional block diagram showing a configuration of a synchronous rectification prohibition unit.

FIG. 6 is a functional block diagram showing a detailed configuration of the SR prohibition unit 115a. The SR prohibition unit 115a outputs a synchronous rectification prohibition signal (hereafter, SR prohibition signal) MMCPA based on the count value DA0–DA3 and the up-down signal DA, at least for a period of time while the count value DA0–DA3 is decreasing. According to this specific example of FIG. 6, the SR prohibition signal MMCPA is outputted when the up-down signal DA is in a phase of a counting-down (i.e. low level) as well as the count value DA0–DA3 is between 7 and 0.

Figure 7:
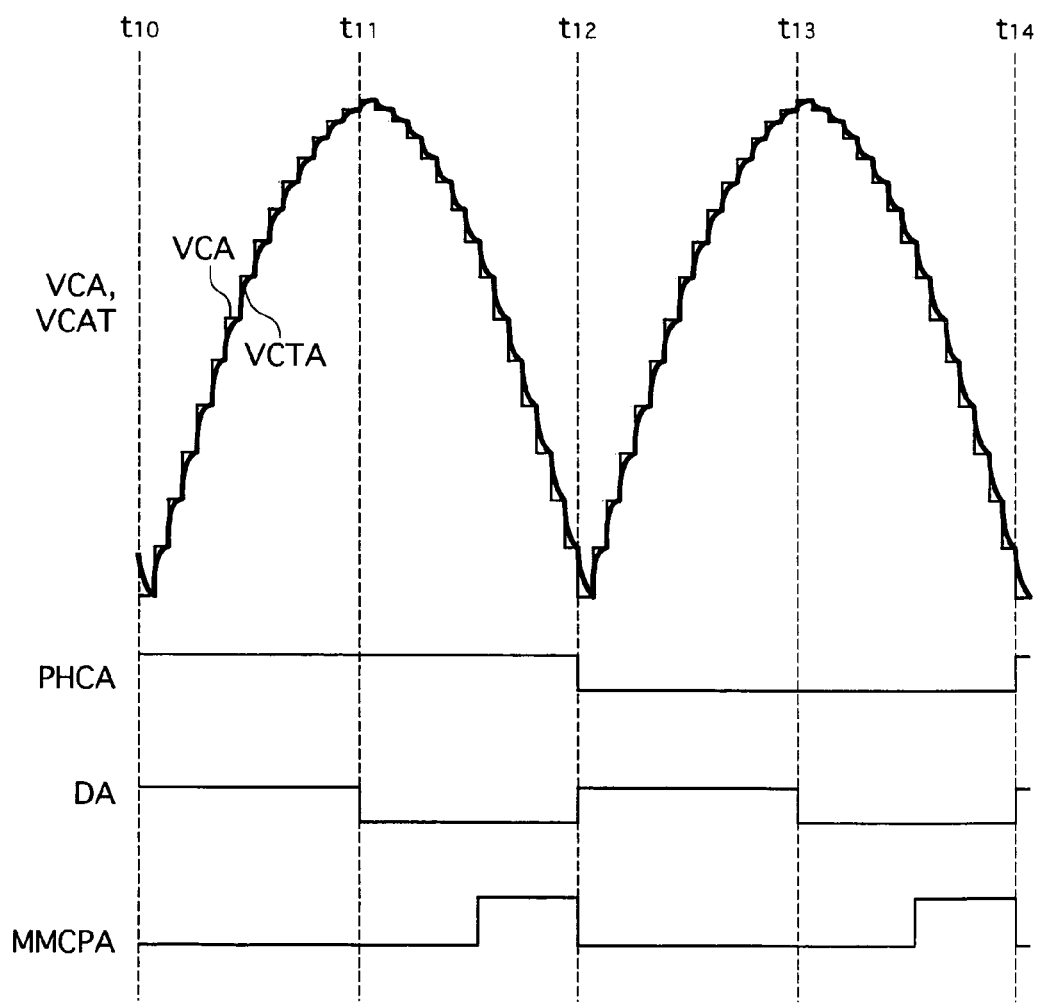
FIG. 7 is a waveform chart illustrating time changes of main signals relevant to prohibition control over the synchronous rectification.

FIG. 7 is a waveform chart illustrating time changes of main signals relevant to the prohibition control over the synchronous rectification. The figure presents the reference signal VCTA and the SR prohibition signal MMCPA along with some of the signals shown in FIG. 3. As can be seen in FIG. 7, the SR prohibition signal MMCPA is outputted when the reference signal VCTA is decreasing at a relatively rapid rate.

1.5 PWM Control Operation on Coil Current

The following explains the details of operations for the coil current supply and the regeneration control, which are performed by a cooperation of the PWM reference signal generation unit 1, the reference signal generation unit 110a, the SR prohibition unit 115a, the PWM control unit 120a, the bridge rectification circuit 130a and the supply current measurement unit 140a.

First, the case when the synchronous rectification is carried out is described.

Figure 8:
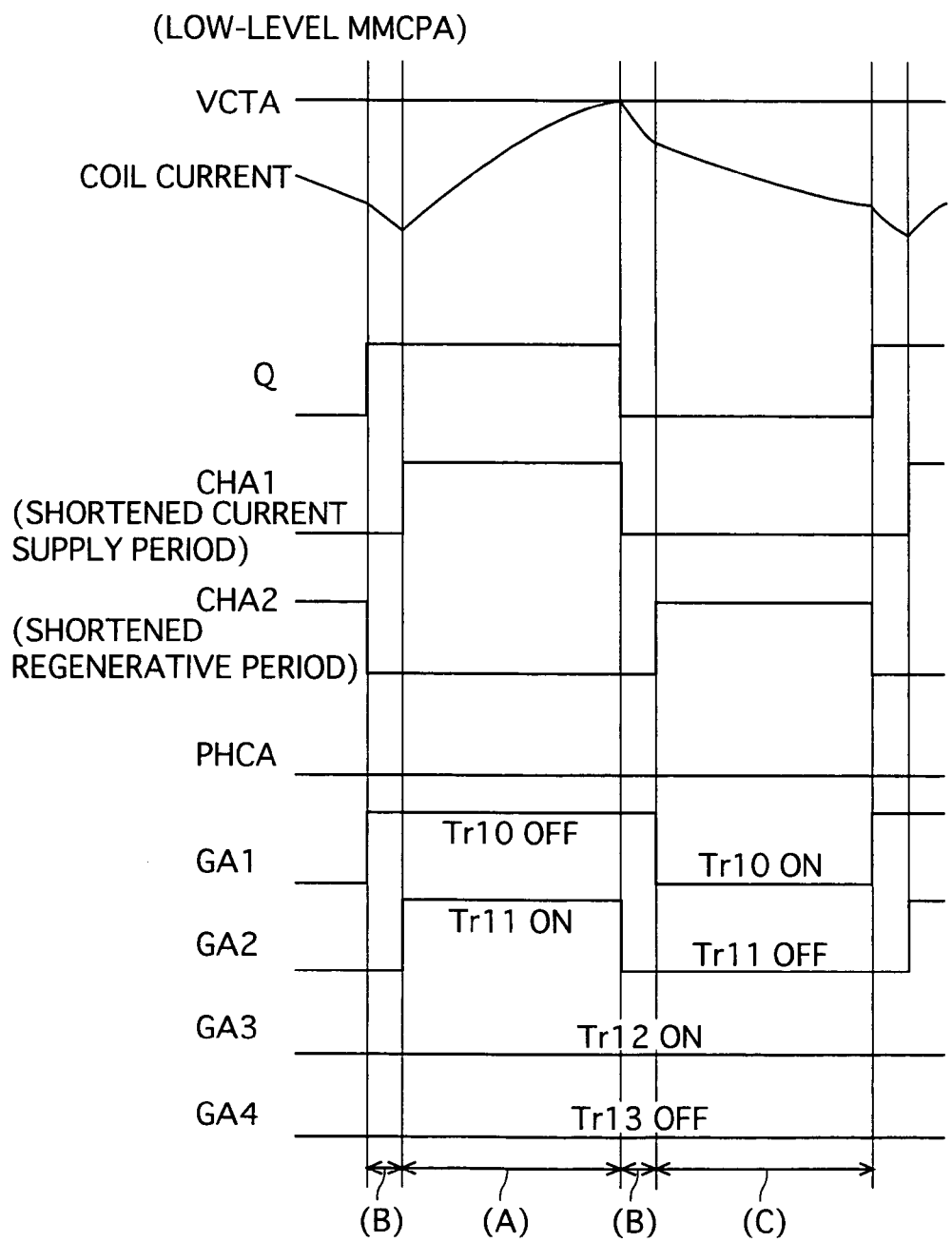
FIG. 8 is a waveform chart illustrating time changes of main signals relevant to PWM control.

FIG. 8 is a waveform chart showing time changes of main control signals relevant to the control over the coil current when the synchronous rectification is carried out. The figure illustrates the case when the polarity signal PHCA is low level and the SR prohibition signal MMCPA is also low level.

The PWM reference signal generation unit 1 generates a PWM reference signal (not shown), which indicates the start of the period for current supply to the coil, in a predetermined cycle.

The flip-flop 5 is set in sync with a trailing edge of the PWM reference signal. When the supply current to the coil exceeds the current represented by the reference signal VCTA, the comparator 4 outputs a signal to reset the flip-flop 5. The level of a supply instruction signal Q outputted by the flip-flop 5 indicates either a current supply period (high level Q) or a regenerative period (low level Q).

The flow-through protection logic unit 7 generates a signal CHA1 indicating a shortened current supply period as well as a signal CHA2 indicating a shortened regenerative period. The energization logic unit 6 outputs respective gate signals GA1–GA4 according to the signals CHA1 and CHA2 and the polarity signal PHCA.

Note here that the gate signals GA1 and GA3 are negative logic signals, each of which brings a corresponding transistor into conduction when the signal is low level. On the other hand, the gate signals GA2 and GA4 are positive logic signals, each of which brings a corresponding transistor into conduction when the signal is high level.

As shown in FIG. 8, one cycle of the supply instruction signal Q is divided into: (A) a shortened current supply period, (B) flow-through protection periods, and (C) a shortened regenerative period. Respective periods are determined by the combination of the levels of signals CHA1 and CHA2.

The polarity signal PHCA is constantly low level. The gate signal GA1 becomes low level only during the shortened regenerative period (therefore, the transistor 10 conducts only during this period), whereas the gate signal GA2 becomes high level only during the shortened current supply period (the transistor 11 conducts only during this period). In addition, the gate signal GA3 is constantly low level (the transistor 12 conducts constantly) and the gate signal GA4 is constantly low level (the transistor 13 constantly stays out of conduction).

Figure 9:
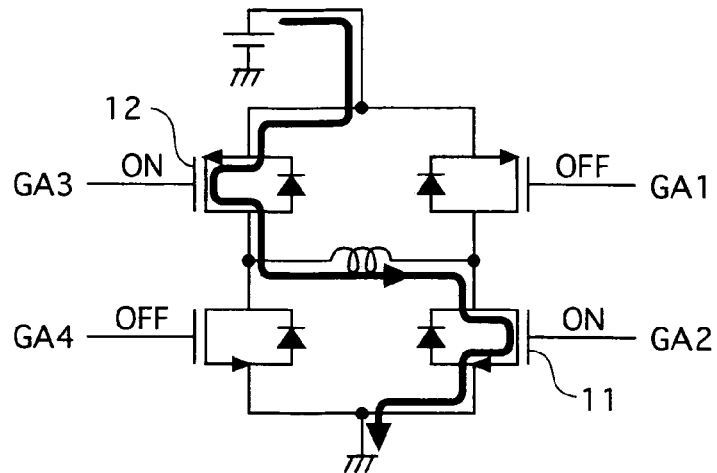
FIG. 9 is a conceptual diagram for explaining coil current paths which are formed according to control exerted by an energization logic unit.
Figure 9:
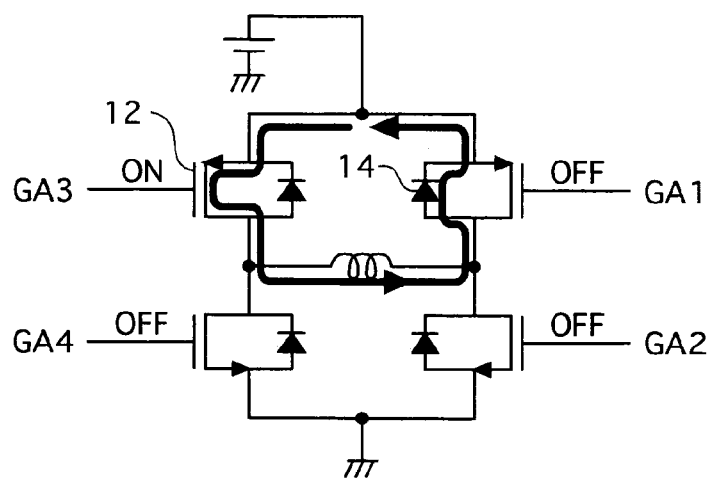
Figure 9:
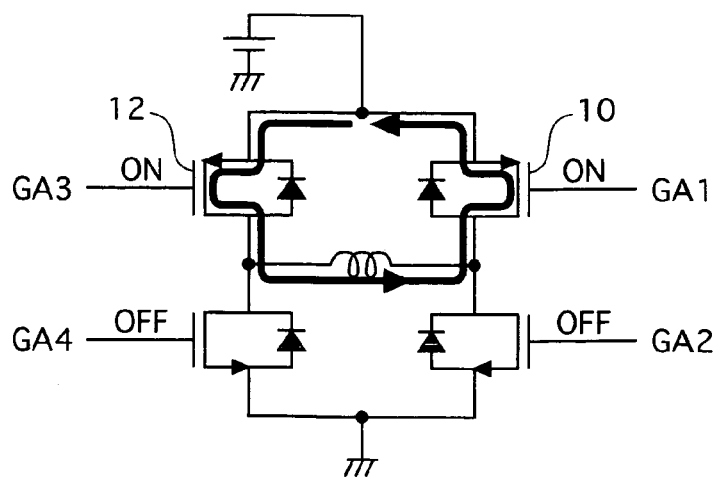

FIG. 9 is a conceptual diagram illustrating coil current paths formed during the above-mentioned periods, according to the control exerted by the energization logic unit 6.

Path A is formed during the shortened current supply period. A current is supplied to the coil along Path A, and the supply current progressively increases.

Once the supply current exceeds the current represented by the reference signal VCTA, the period shifts to a flow-through protection period and Path B is formed. The regenerative current from the coil circulates along Path B passing through the flywheel diode 14 and the transistor 12, and then gradually decays.

In the shortened regenerative period, Path C is formed. The regenerative current out of the coil gradually decays as circulating along Path C via the transistors 10 and 12. This state, in which the regenerative current circulates along Path C, is synchronous rectification.

The flow-through protection periods are provided so as not to bring both transistors 10 and 11 into conduction at the same time when the current path switches from one to the other, and thereby short the current power supply 8.

The above control operation is repeated every cycle of the PWM reference signal, and the coil current is controlled by the limit value, which is represented by the reference signal VCTA.

Second, the case when the synchronous rectification is not carried out is described.

Figure 10:
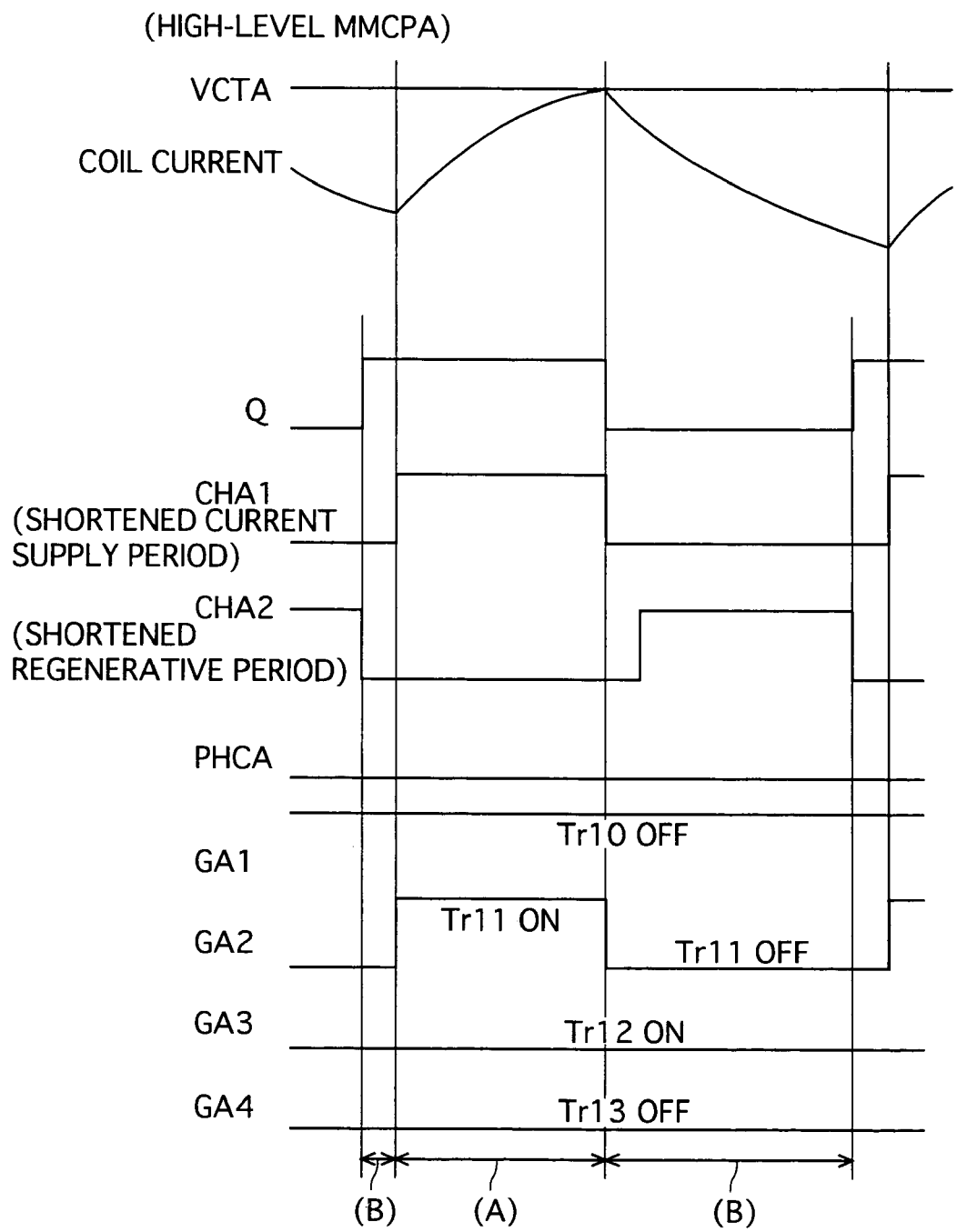
FIG. 10 is a waveform chart illustrating time changes of main signals relevant to PWM control.

FIG. 10 is a waveform chart showing time changes of main control signals relevant to the control over the coil current when the synchronous rectification is not curried out. The figure illustrates the case when the polarity signal PHCA is low level while the SR prohibition signal MMCPA is high level.

In the case the synchronous rectification is not carried out, the SR prohibition signal MMCPA becomes high level and masks the signal CHA2. As a result, the level of the gate signal GA1 is maintained at a high level not only during the shortened current supply period and the flow-through protection periods but also during the shortened regenerative period, and therefore the transistor 10 does not conduct. Consequentially, the coil current circulates consistently along Path B through the flywheel diode 14 and gradually decays. Namely, the synchronous rectification is not carried out.

When the synchronous rectification is not carried out, the regenerative current is restrained through a voltage loss of the flywheel diode 14. Accordingly, energy stored in the coil 19*a* rapidly decreases and thereby the regenerative current quickly decays, compared to the case when the synchronous rectification is carried out.

When the polarity signal PHCA is high level, the same operation described above is carried out in a left-right mirror-reversed manner of the circuits shown in FIG. 9.

According to the above-cited configuration, in order to prohibit the synchronous rectification, the SR prohibition signal MMCPA is outputted when the reference signal VCTA is decreasing at a relatively rapid rate. Herewith, the coil current rapidly decays during this period, and therefore the coil current follows the limit value closely. Furthermore, in the time other than the above period, the power supply efficiency is enhanced by mitigating the decay of the coil current.

1.6 Function to Prohibit Synchronous Rectification

As mentioned above, when the synchronous rectification is not carried out, the regenerative current out of the coil rapidly decays compared to when the synchronous rectification is carried out. This is explained using equivalent circuits as follows.

Figure 11A:
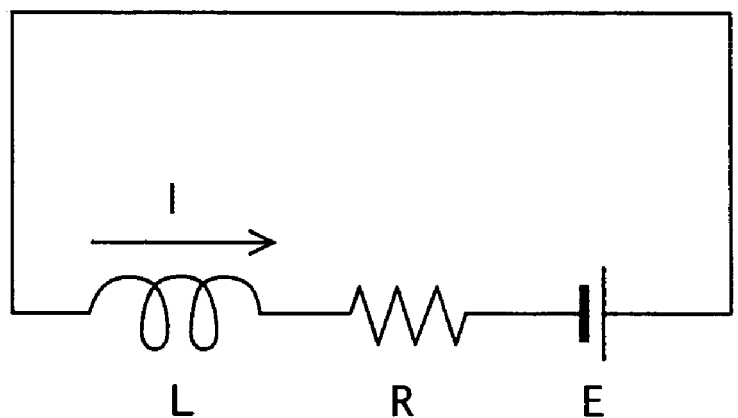
FIGS. 11A and 11B are equivalent circuits of regenerative current paths, in each of which a back electromotive force arising at the coil is taken into account.
Figure 11B:
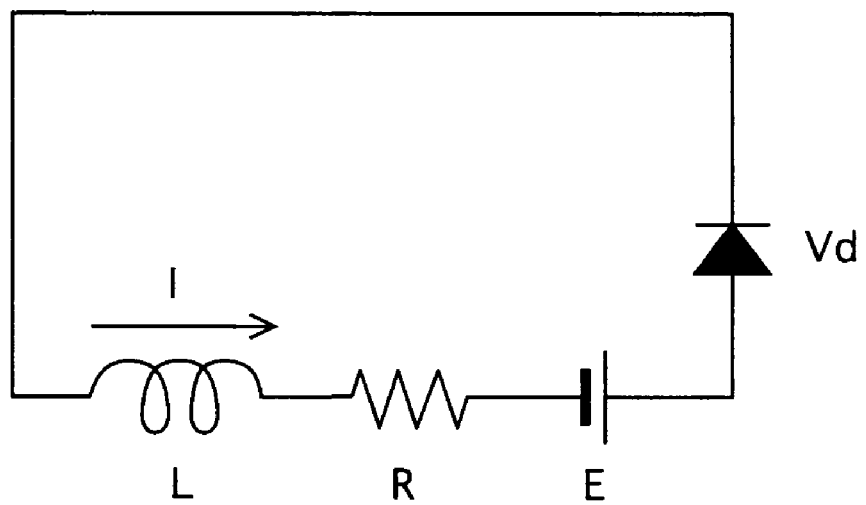

FIGS. 11A and 11B are equivalent circuits of Path C and Path B shown in FIG. 9, respectively. Both equivalent circuits are shown taking into account a back electromotive force arising at the coil due to the rotation of the motor, but in disregard of the on-resistance of the transistors. In these figures, I=coil current, L=reactance value of the coil, R=resistance of the coil, and E=back electromotive force arising at the coil due to a changing magnetic field which occurs as the rotor rotates. For the sake of simplicity, it is assumed that E is a constant as a function of the rotational speed of the motor.

Here, t=time with a base point (i.e. t=0) at which the current supply period switches to the regenerative period, $I_0$=coil current at t=0, $\tau$=L/R (time constant), and Vd=voltage loss by the flywheel diode. The coil current value Ia of the equivalent circuit in FIG. 11A, where the synchronous rectification is carried out, can be expressed with the following equation:

$$Ia=(I_0+E/R)\times\exp(-t/\tau)-E/R(0\leq t) \quad (Eq.\ 1)$$

The coil current value Ib of the equivalent circuit in FIG. 11B, where the synchronous rectification is not carried out, is expressed with:

$$Ib=(I_0+(E+Vd)/R)\times\exp(-t/\tau)-(E+Vd)/R(0\leq t) \quad (Eq.\ 2)$$

Figure 12:
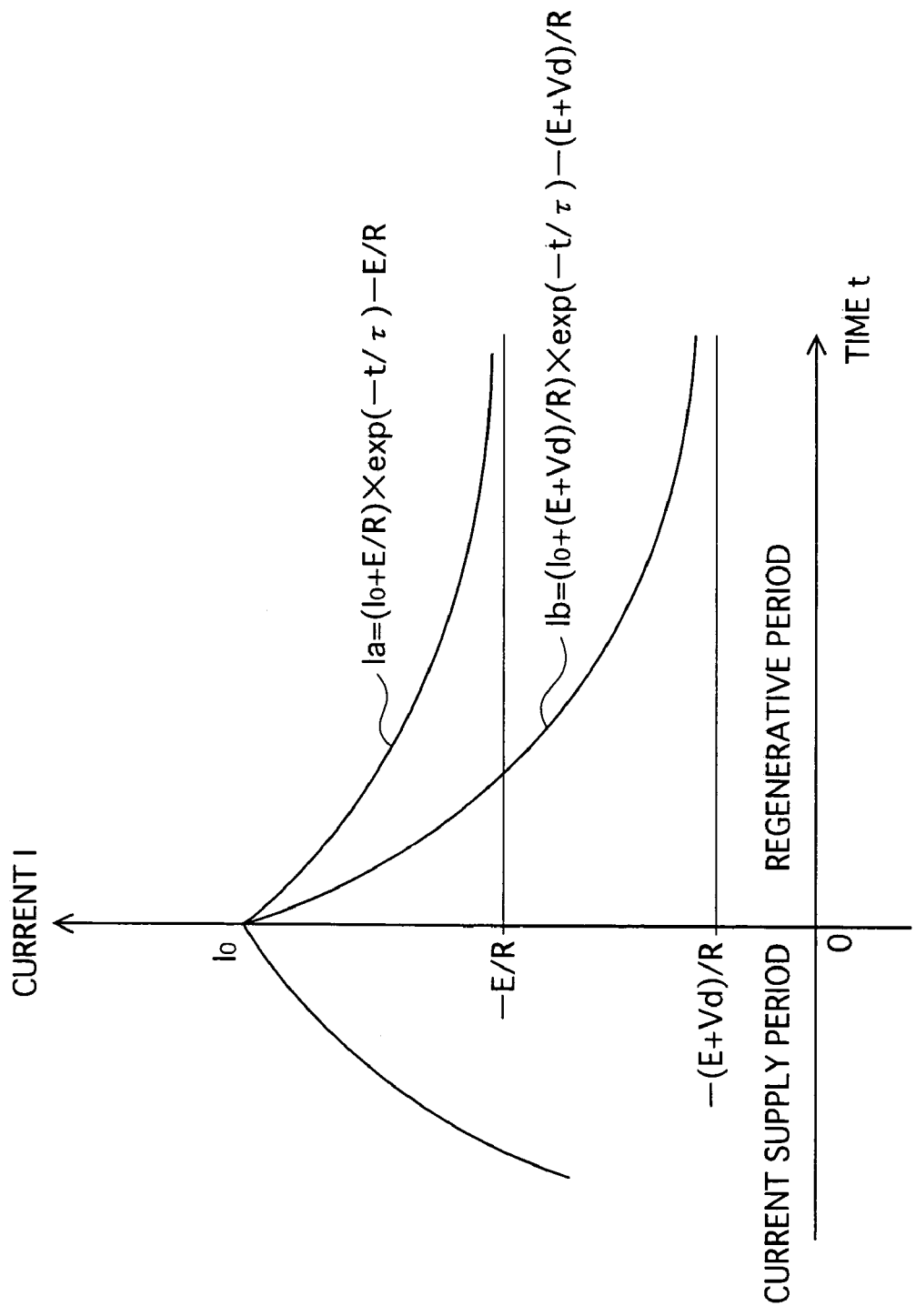
FIG. 12 is a graph showing decay characteristics of the regenerative currents as determined by current paths.

FIG. 12 is a graph showing examples of the decay characteristics of the regenerative currents expressed with Eq. 1 and Eq. 2, respectively. These examples are illustrated assuming that Vd is about 0.7 V and E is rather smaller than −Vd.

It can be observed from Eq. 1 that the value −(E/R) increases as the motor rotates at a higher speed, which results in a slowdown in the coil current decay. If the synchronous rectification is prohibited, the back electromotive force arising at the coil is offset by the voltage loss of the flywheel diode, and therefore the coil current decay will accelerate.

What this means is that prohibiting the synchronous rectification when the absolute value of the limit value is rapidly decreasing makes the coil current follow the limit value closely. The effect is prominent especially at the time of the high-speed rotation of the motor when the coil current decay slows down.

1.7 Review

There is a problem with using a staircase signal as a reference signal. That is, noise and vibration are induced due to torque fluctuations arising when the level of the staircase signal increases and decreases stepwise. However, the reference signal VCTA of the present invention does not have a stepwise level change. Hence, the present invention entirely eliminates the above problem.

With a view to deterring vibration and noise, the coil current is controlled to a limit value represented, for example, by an approximate sinusoidal reference signal. In this case, when the reference signal VCTA is decreasing at a relatively rapid rate, the coil current is let to decay at a high rate by prohibiting the synchronous rectification. Herewith, the coil current follows the limit value closely. In the time other than the above period, the current power supply efficiency is enhanced by mitigating the coil current decay through the synchronous rectification.

Thus, providing the implementation and prohibition periods of the synchronous rectification according to the decreasing rate of the reference signal VCAT allows to achieve an adequate reduction in vibration and noise as well as a good efficiency in the current power supply.

In addition, the stepping motor drive device of the present invention exercises a PWM control on a current supplied to the coil using a current chopper method. This achieves lower power operation compared to the case where the current is supplied to the coil by voltage control.

Note that the supply current measurement unit 140a may be composed simply of a resistor, instead of the ON resistance adjustment circuit 24 and the transistor 23. Furthermore, the supply current measurement unit 140a does not have to include an operational amplifier 21.

2. Second Embodiment

A stepping motor drive device of the second embodiment of the present invention differs from the first embodiment in the way of generating the reference signal. According to the second embodiment, the above-mentioned change rate signal is generated within the device by discriminating a pulse frequency of the clock signal. Then, using the change rate signal, the reference signal is generated. The following mainly describes the differences of the second embodiment from the first embodiment.

2.1 Configuration of Major Components Relevant to Reference Signal Generation

Figure 13:
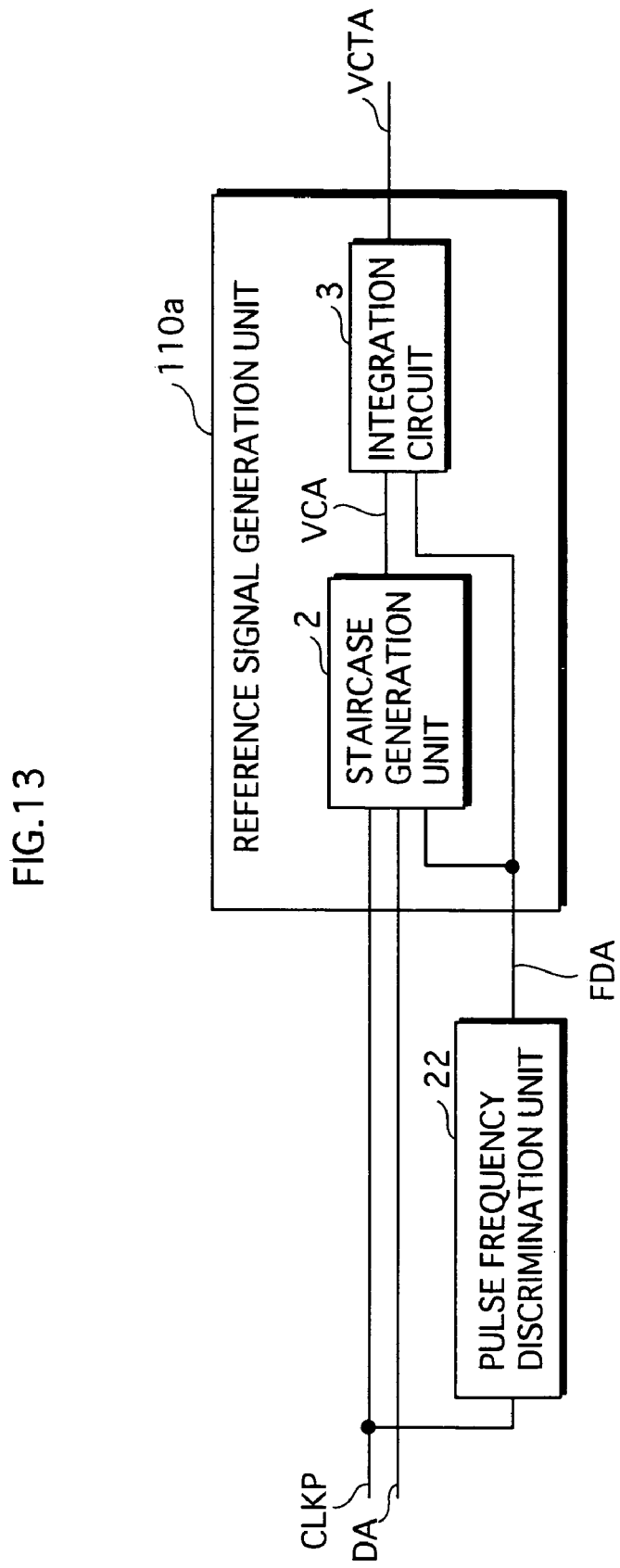
FIG. 13 is a functional block diagram showing a modification related to the reference signal generation.

FIG. 13 is a functional block diagram showing a configuration relevant to the reference signal generation in the second embodiment. Compared to the first embodiment, a pulse frequency discrimination unit 22 is added. In the first embodiment, the change rate signal FDA is provided from outside. However, in the second embodiment, the pulse frequency discrimination unit 22 generates the change rate signal FDA by discriminating a pulse frequency of the clock signal CLKP.

Figure 14:
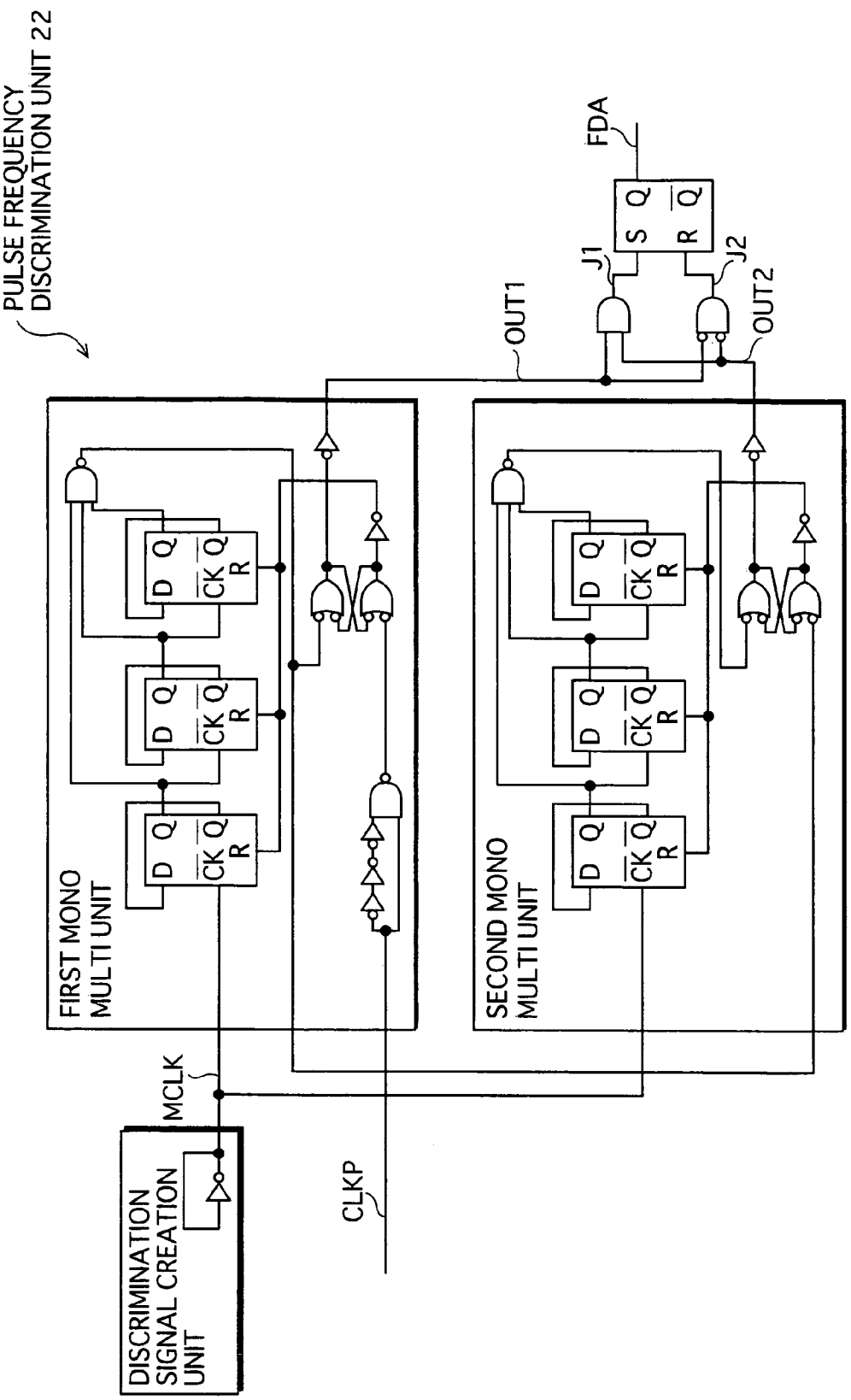
FIG. 14 is a functional block diagram showing a configuration of a pulse frequency discrimination unit.

FIG. 14 is a functional block diagram showing a configuration of the pulse frequency discrimination unit 22.

A first mono multi unit is a monostable multivibrator which is constructed using a digital circuit. The first mono multi unit is triggered in sync with the clock signal CLKP, and outputs an output signal OUT1 for a period of eight pulses of a discrimination signal MCLK.

A second mono multi unit is a monostable multivibrator which is constructed using a digital circuit. The second mono multi unit is triggered when the output of the output signal OUT1 ends, and outputs an output signal OUT2 for a period of eight pulses of the discrimination signal MCLK.

A signal J1 indicates a period when both OUT1 and OUT2 are being outputted, whereas a signal J2 indicates a period when neither OUT1 nor OUT2 is being outputted.

The pulse frequency discrimination unit 22 discriminates between a short and a long cycle (i.e. the pulse frequencies) of the clock signal CLKP, depending on whether an output of a succeeding OUT1 starts during or after an output of the preceding OUT2.

2.2 Operation of Pulse Frequency Discrimination Unit 22

Figure 15:
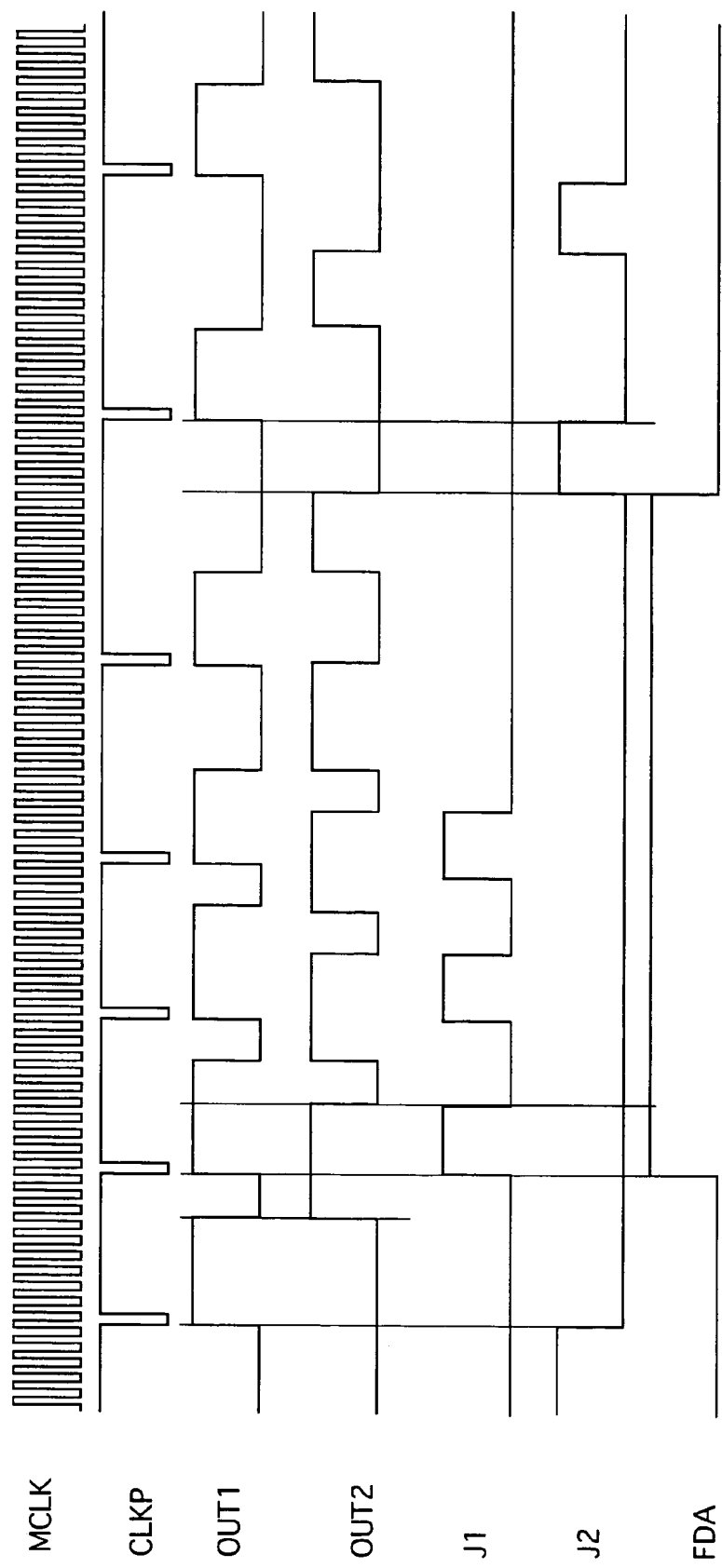
FIG. 15 is a waveform chart illustrating time changes of main signals in the pulse frequency discrimination unit.

FIG. 15 is a waveform chart illustrating time changes of main signals in the pulse frequency discrimination unit 22.

The left half of FIG. 15 shows a case in which the cycle of the clock signal CLKP is short (i.e. high pulse frequency). In this case, an output of a succeeding OUT1 starts during an output of the preceding OUT2. Accordingly, the signal J1 is outputted in sync with the clock signal CLKP while the signal J2 is not outputted. As a result, the flip-flop remains set and the change rate signal FDA is maintained at a high level.

The right half of FIG. 15 shows a case in which the cycle of the clock signal CLKP is long (i.e. low pulse frequency). In this case, an output of a succeeding OUT1 starts after an output of the preceding OUT2. Accordingly, the signal J2 is outputted in sync with the clock signal CLKP while the signal J1 is not outputted. As a result, the flip-flop remains reset, and therefore the change rate signal FDA is maintained at a low level.

3. Third Embodiment

A stepping motor drive device of the third embodiment of the present invention differs from the second embodiment in the configuration relevant to the reference signal VCTA generation. The following mainly describes the differences of the third embodiment from the second embodiment.

3.1 Configuration of Major Components Relating to Reference Signal Generation

Figure 16:
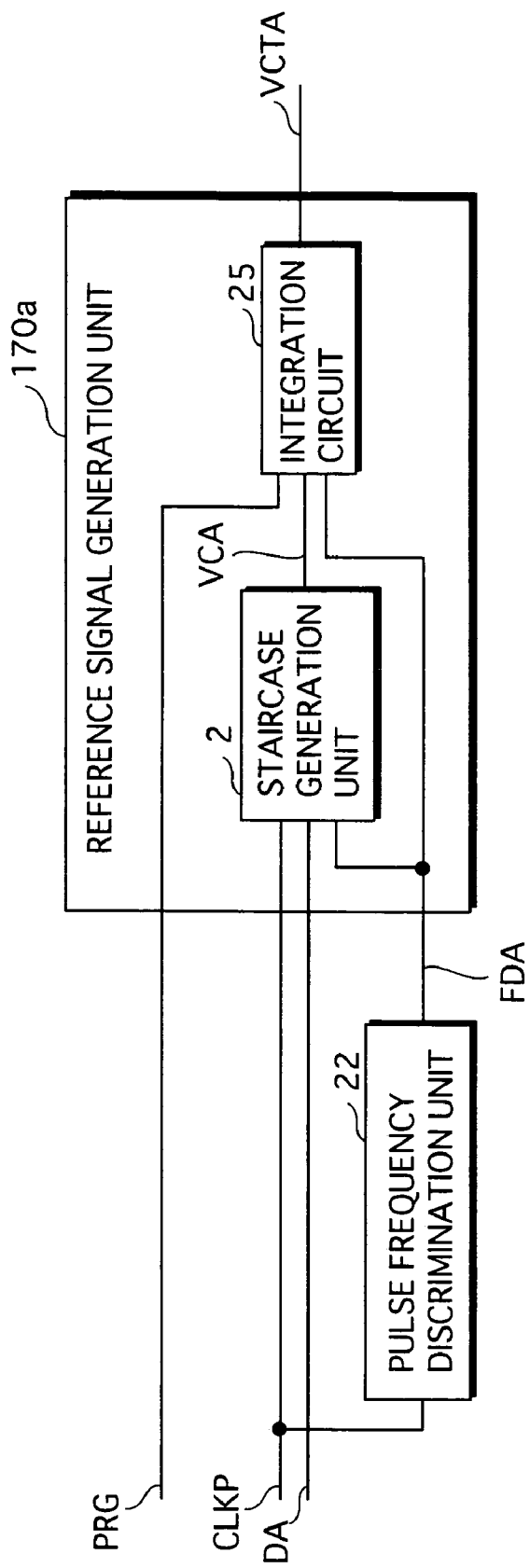
FIG. 16 is a functional block diagram showing another modification related to the reference signal generation.

FIG. 16 is a functional block diagram showing a configuration relevant to the reference signal generation in the third embodiment. Compared to the second embodiment, an integration circuit 25 is used, instead of the integration circuit 3.

3.2 Integration Circuit 25

The integration circuit 25 includes switches controlled by both a change rate signal FDA and a program signal PRG so as to adjust resistance that determines a time constant.

Figure 17:
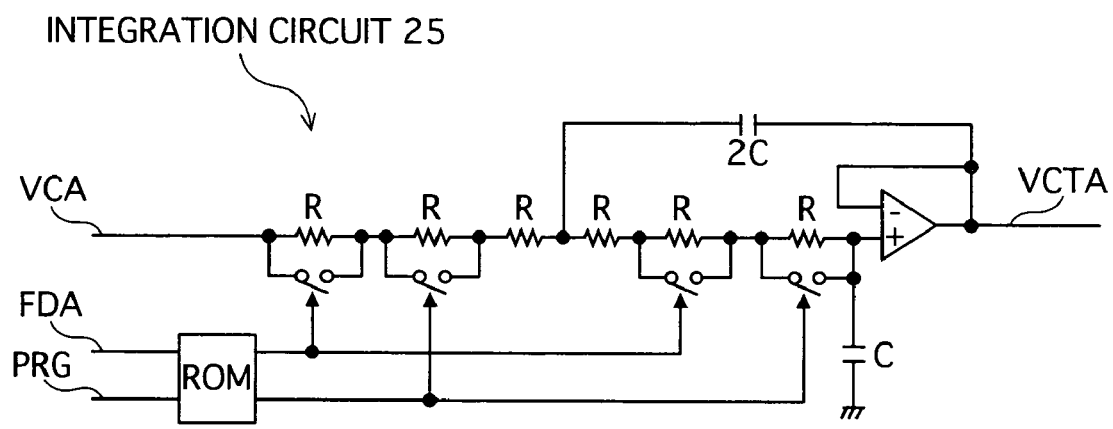
FIG. 17 is a functional block diagram showing a configuration of an integration circuit according to the third embodiment.

FIG. 17 is a functional block diagram showing a detailed configuration of the integration circuit 25. In order to choose an appropriate time constant suited for a situation, the ROM prestores information for each of a plurality of time constants. This information indicates whether respective switches should be shorted/open so as to obtain a predetermined time constant. The integration circuit 25 reads the information from the ROM according to the change rate signal FDA and the program signal PRG. The integration circuit 25 then outputs signals each instructing a predetermined switch to be in a shorted/open state as indicated by the read information, to the respective switches.

In this configuration, the integration circuit 25 is provided with, for example, the program signal PRG conforming to the step level of the staircase signal VCA, along with the change rate signal FDA which has been obtained by discriminating a step cycle of the staircase signal VCA. Herewith, the integration circuit 25 is able to set an appropriate time constant and obtain a reference signal VCTA which follows the average gradient of the staircase signal VCA.

The case of using an approximate sinusoidal staircase signal VCA, as explained in the first embodiment, will be an adequate and specific example here. In this case, the program signal PRG may be provided when the step height of the staircase signal VCA becomes relatively large, for example when the up-down counter of the staircase generation unit indicates the count value between 0 and 7. Based on such a program signal PRG, the reference signal VCTA takes on a more approximate sinusoidal waveform which follows the average gradient of the temporally changing staircase VCA with precision. As a result, the induced vibration and noise are further reduced.

4. Fourth Embodiment

A stepping motor drive device of the fourth embodiment of the present invention differs from the first embodiment in that a unit for delaying the polarity signal is added. The following mainly describes the differences of the fourth embodiment from the first embodiment.

4.1 Overall Configuration

Figure 18:
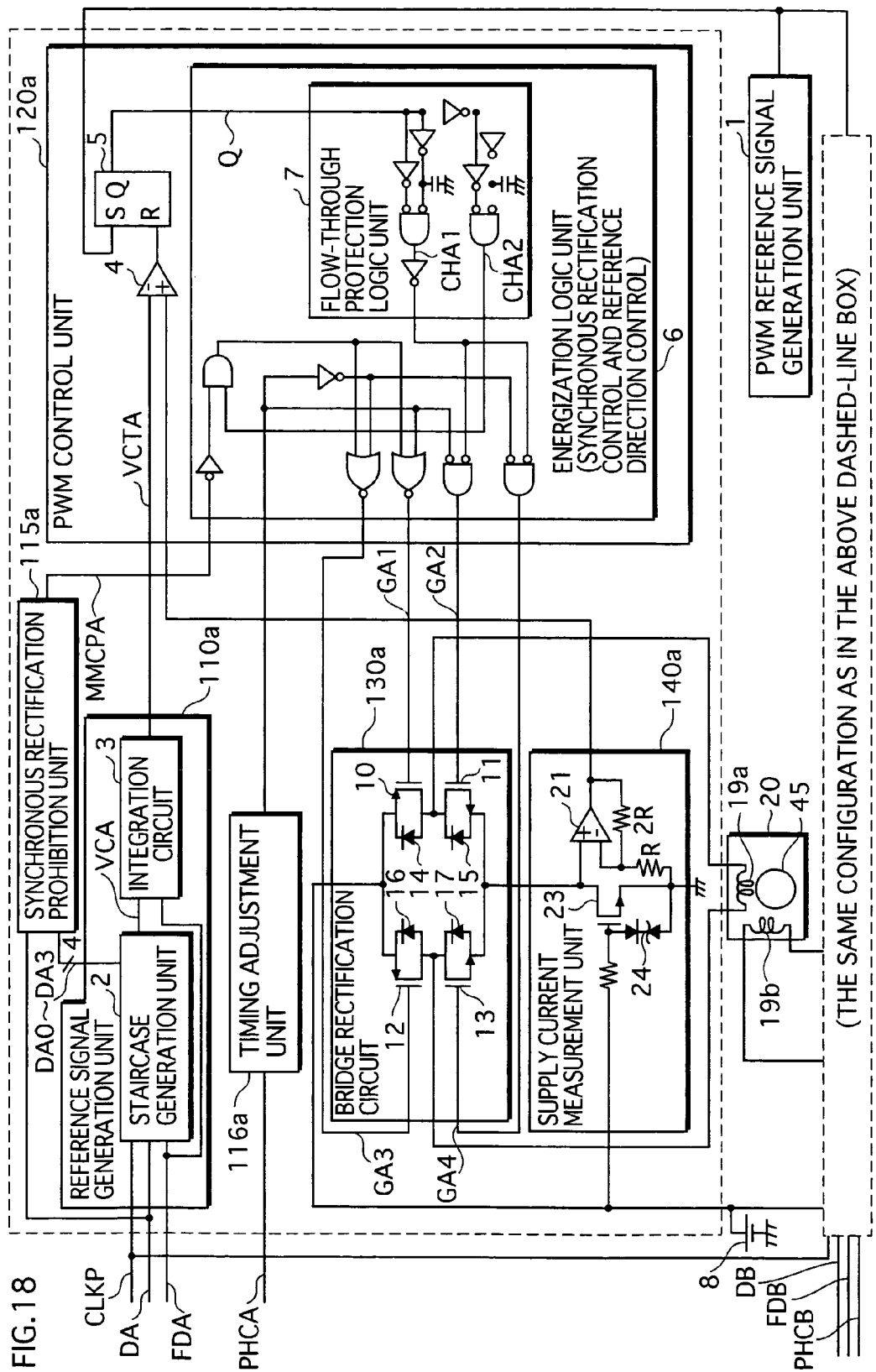
FIG. 18 is a functional block diagram showing a configuration of a stepping motor drive device according to the fourth embodiment.

FIG. 18 is a functional block diagram showing an overall configuration of a stepping motor drive device according to the fourth embodiment. Note that a stepping motor, the driven unit of the device, is also shown in the figure. This stepping motor drive device is configured by adding a timing adjustment unit 116a to the first embodiment (see FIG. 1). The timing adjustment unit 116a outputs the polarity signal PHCA, to the energization logic unit 6, with a delay of a specified period of time.

4.2 Timing Adjustment Unit 116a

Figure 19:
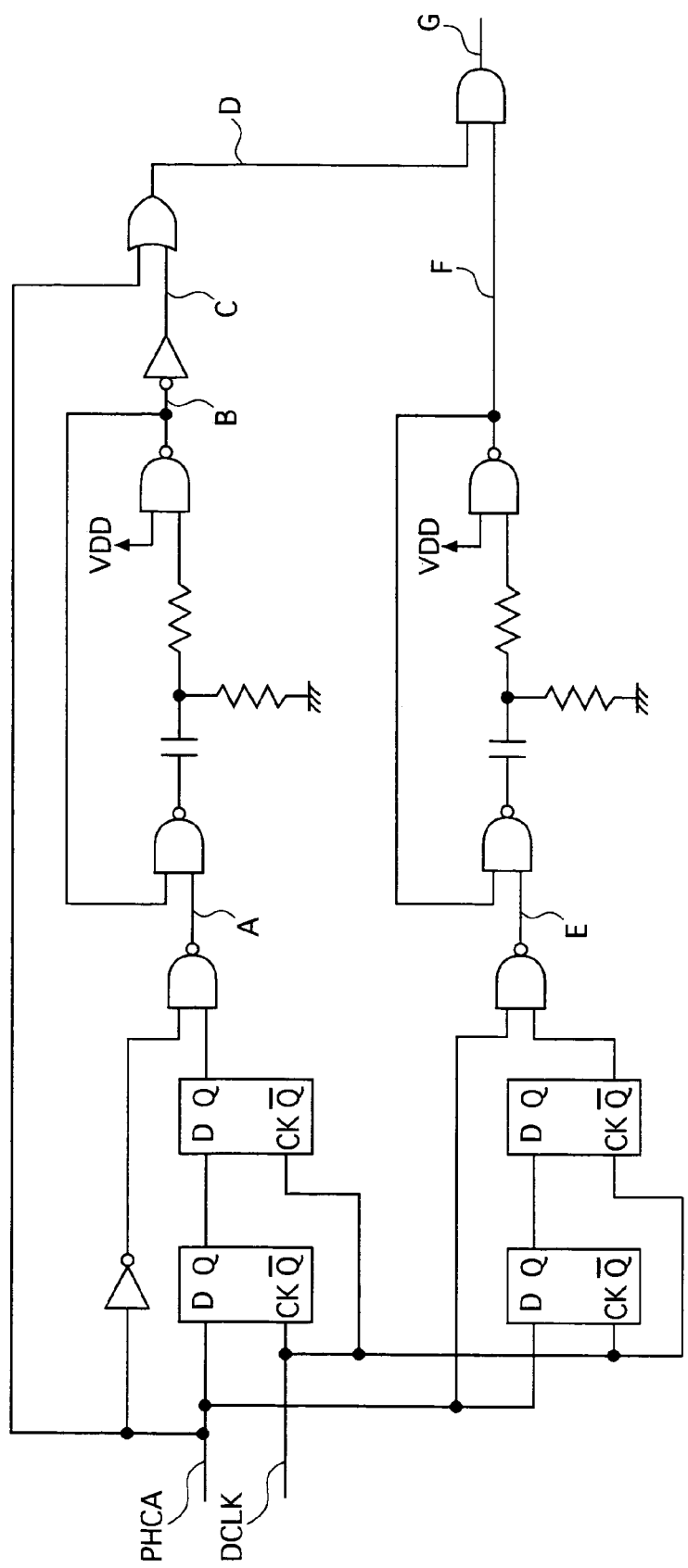
FIG. 19 is a functional block diagram showing a configuration of a timing adjustment unit.

FIG. 19 is a functional block diagram showing a detailed configuration of the timing adjustment unit 116a. Being input the polarity signal PHCA and a delay signal DCLK, the timing adjustment unit 116a outputs a delayed polarity signal G.

The delay signal DCLK is a clock signal which has a cycle shorter than one pulse per step of the staircase signal VCA. For instance, the PWM reference signal outputted from the PWM reference signal generation unit 1 can be used as the delay signal DCLK. In FIG. 18, a signal line to supply the delay signal DCLK is omitted.

The timing adjustment unit 116a synchronously differentiates the leading edge and trailing edge of the polarity signal PHCA based on the delay signal DCLK in order to generate a signal A and signal E, respectively. The signal A is extended to generate a signal C, while the signal E is also extended to generate a signal F. Then, by synthesizing the signals C and F and the polarity signal PHCA, the timing adjustment unit 116a outputs the delayed polarity signal G.

Figure 20:
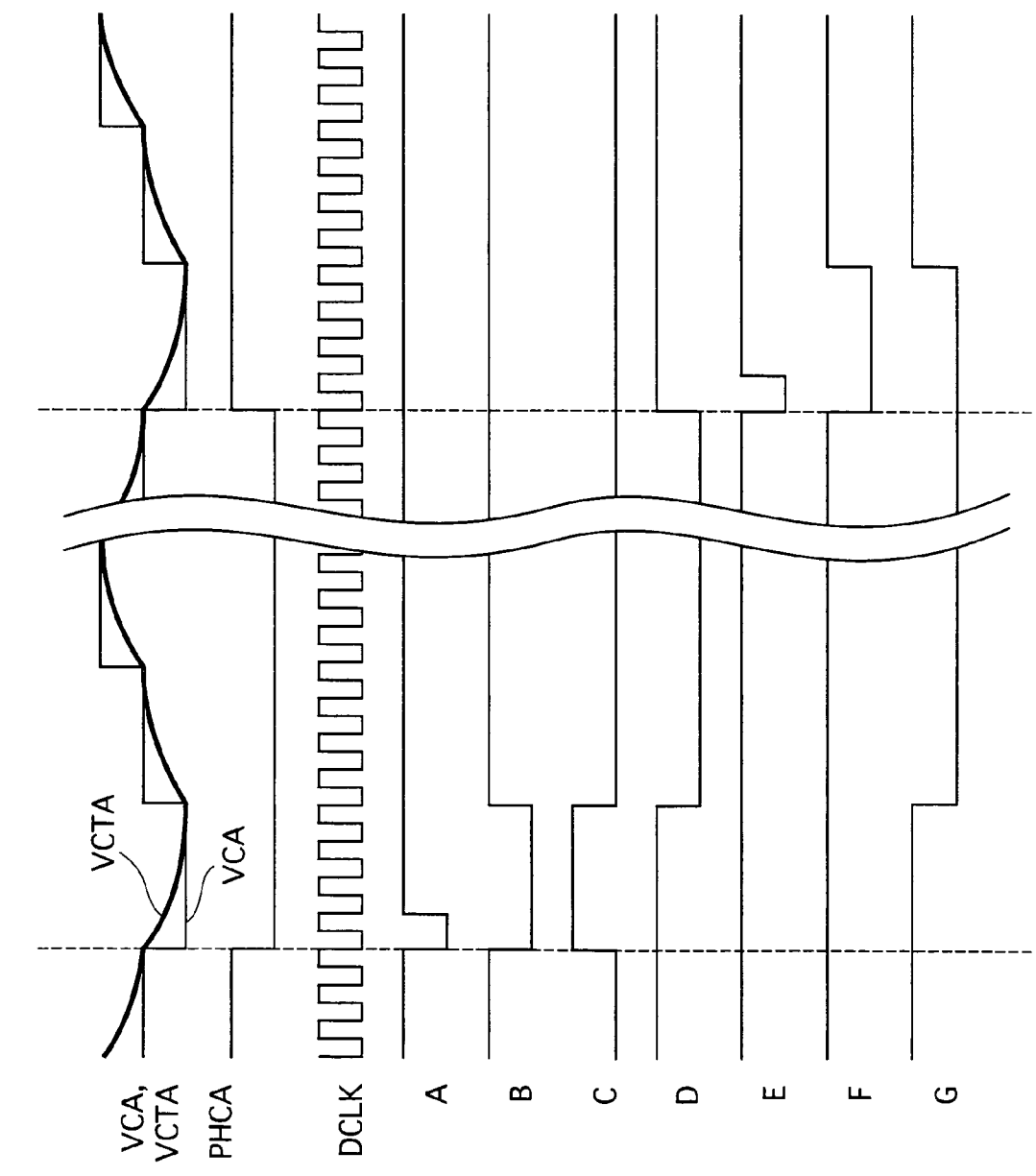
FIG. 20 is a waveform chart illustrating time changes of main signals in the timing adjustment unit.

FIG. 20 is a waveform chart illustrating time changes of main signals relevant to adjusting a timing of phase reversal. In this example, the output period of each of the signals C and F is made to largely match one pulse per step of the staircase signal VCA. This output period corresponds to a time period required for the level of the reference signal VCTA (i.e. the limit value of the coil current) to decrease by an amount approximately equivalent to one step of the staircase signal VCA. As a result, the delayed polarity signal G, which is the polarity signal PHCA being delayed for the above time period, is obtained.

4.3 Effect of Delaying Polarity Signal

Figure 21A:
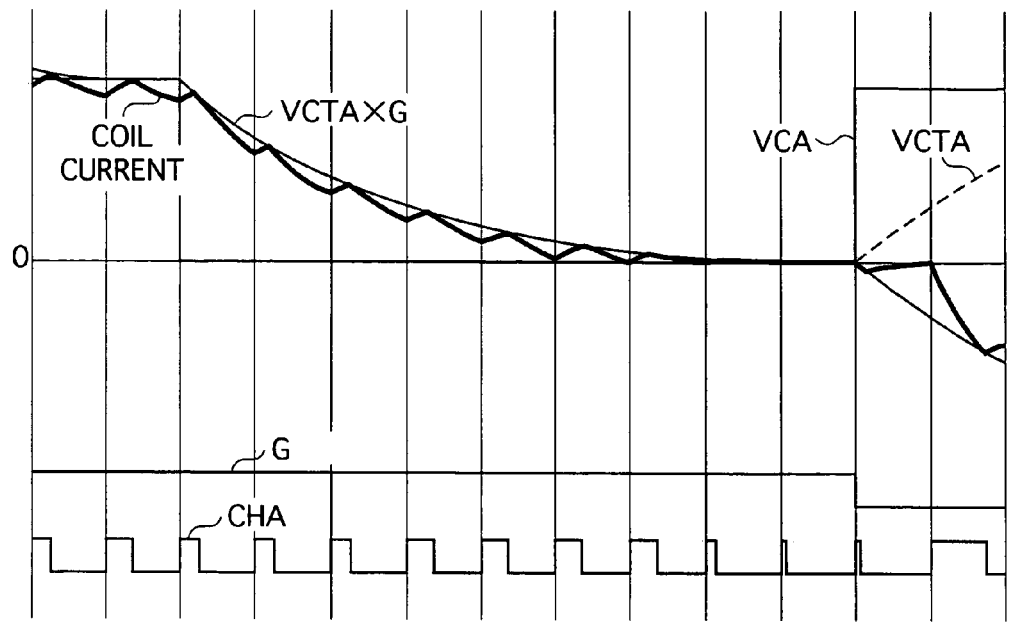
FIGS. 21A and 21B are conceptual diagrams showing an effect of a timing adjustment for reversing a reference direction of a coil current.
Figure 21B:
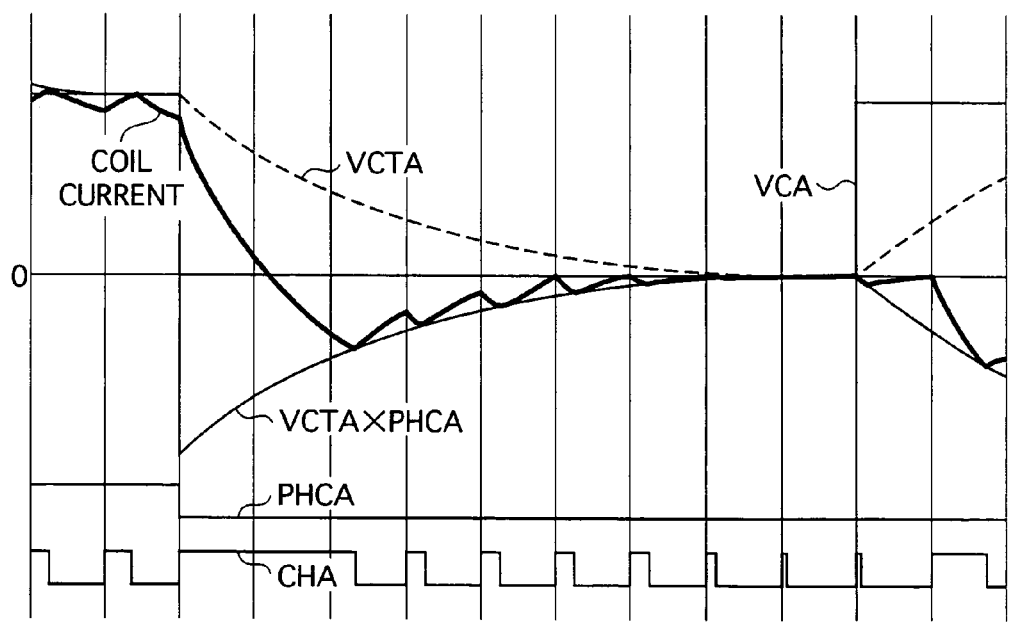

FIGS. 21A and 21B are conceptual diagrams illustrating the effect of delaying the polarity signal, and are waveform charts showing time changes of the coil currents. FIG. 21A depicts the case of using the delayed polarity signal G, and FIG. 21B depicts the case of using undelayed polarity signal PHCA. Note that each vertical line indicates a time point of the trailing edge of the PWM reference signal (not shown). The polarity signal PHCA shall reverse its phase at approximately the same time as the level of the staircase signal VCA reaches zero.

When the delayed polarity signal G or the polarity signal PHCA changes its sign, positive or negative, the reference direction (i.e. a current direction corresponding to the sign of a current value) reverses. Limit values VCTA×G and VCTA×PHCA, each with a sign indicating the reference direction with +/−, are illustrated. The supply currents to the coils are respectively controlled according to the signed limit values VCTA×G and VCTA×PHCA.

In the case of using the undelayed polarity signal PHCA, a current supply from the power supply circuit starts, after the phase of the polarity signal PHCA has been reversed, from the time point of the first trailing edge of the PWM reference signal. This current supply is continued until the coil current starts flowing in the reverse direction of the regenerative current circulating at the start of the current supply, and reaches the limit value represented by the reference signal VCTA. The above operation is illustrated in FIG. 21B. In this case, the ripple factor of the coil current is large and a reduction in vibration and noise when the motor is driven is disturbed.

On the other hand, in the case of using the delayed polarity signal G, the reference direction is reversed when the level of the reference signal VCTA has come sufficiently close to zero. Therefore, compared to the case using the polarity signal PHCA, the ripple factor of the coil current is kept small. This operation is illustrated in FIG. 21A. In this case, vibration and noise induced when the motor is driven can be adequately reduced.

Along with use of the delayed polarity signal G, it can be also considered to stop the current supply to the coil during the period when the level of the staircase signal VCA is zero. Such a control can be exercised using for instance a decode circuit and a gate circuit. Here, the decode circuit outputs a signal for prohibiting the current supply when the count value DA0–DA3 is zero, and according to the supply-prohibiting signal, the gate circuit masks the PWM reference signal provided to the flip-flop 5. As this supply-prohibiting signal, a signal outputted from the top gate circuit shown in FIG. 6 may be used.

This configuration allows an improvement in the power supply efficiency by entirely stopping the current supply to the coil during the period when the level of the staircase signal VCA is zero.

4.4 Modification of Timing Adjustment Unit

Figure 22:
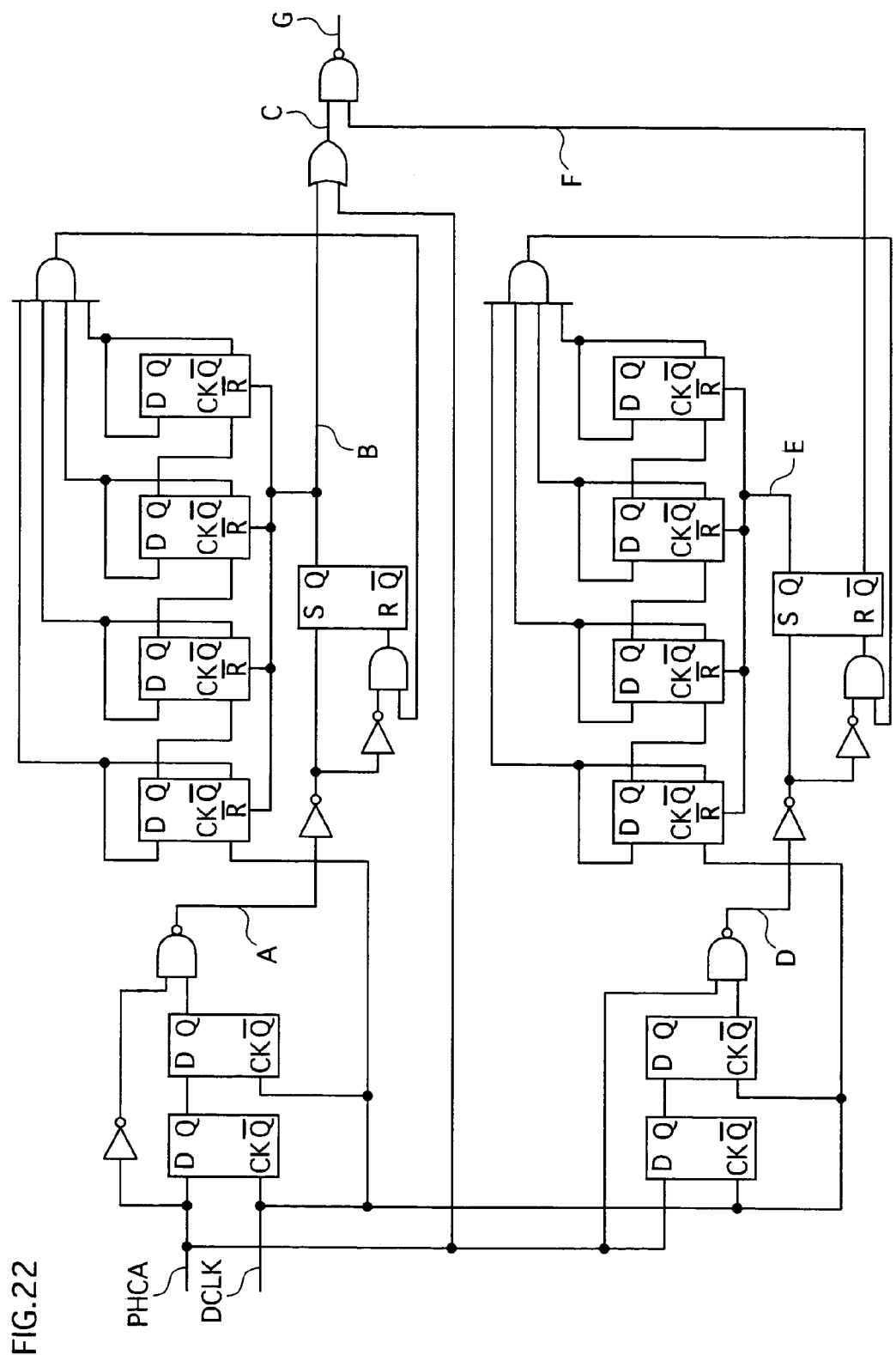
FIG. 22 is a functional block diagram showing another configuration of the timing adjustment unit.

FIG. 22 is a functional block diagram illustrating a modification of the timing adjustment unit shown in FIG. 19. In this modification, the circuits of FIG. 19, in one of which the signal C is generated by extending the signal A and in the other of which the signal F is generated by extending the signal E, are replaced with monostable multivibrators. Each of the monostable multivibrators is constructed using a digital circuit. This modified timing adjustment unit delays the polarity signal PHCA by operating in the same manner as the timing adjustment unit shown in FIG. 19.

5. Fifth Embodiment

A stepping motor drive device of the fifth embodiment of the present invention differs from the first embodiment in that a positive offset is systematically added to an output of the amplifier 21 used for measuring the supply current. The following mainly describes the differences of the fifth embodiment from the first embodiment.

5.1 Configuration for Adding Positive Offset

Figure 23A:
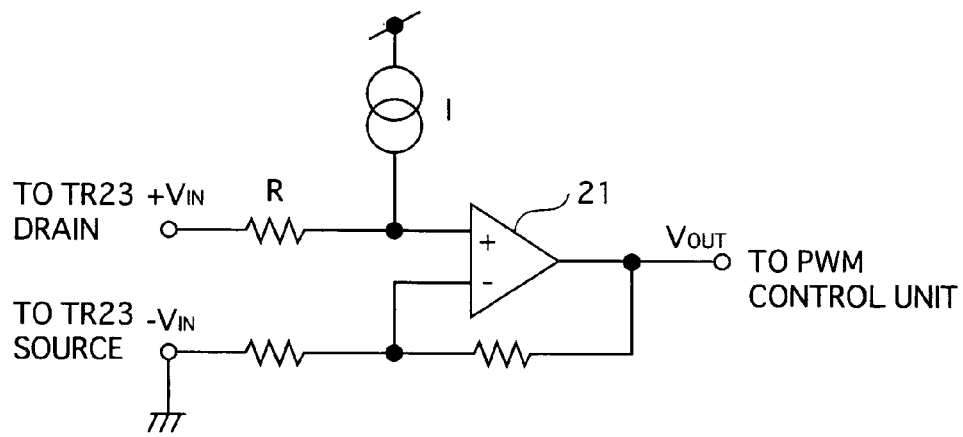
FIGS. 23A and 23B are functional block diagrams showing modifications of a supply current measurement unit.
Figure 23B:
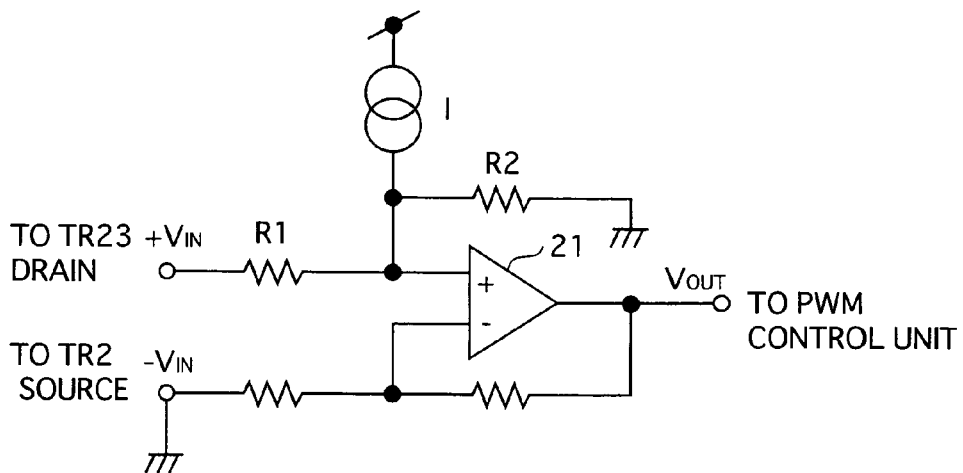

FIGS. 23A and 23B are functional block diagrams illustrating examples of configurations for systematically adding a positive offset to an output of the amplifier 21 used for measuring the supply current. Both configurations are formed by incorporating a constant current source and resistance to a noninverting input terminal of the amplifier 21 in the supply current measurement unit 140a (see FIG. 1).

With the configuration of FIG. 23A, an input voltage, which is obtained by adding an offset voltage I×R to a voltage drop caused by the transistor 23, is amplified and outputted. With the configuration of FIG. 23B, an input voltage, which is obtained by adding an offset voltage I×(R_1+R_2)/(R_1×R_2) to the voltage drop caused by the transistor 23, is amplified and outputted.

Figure 24:
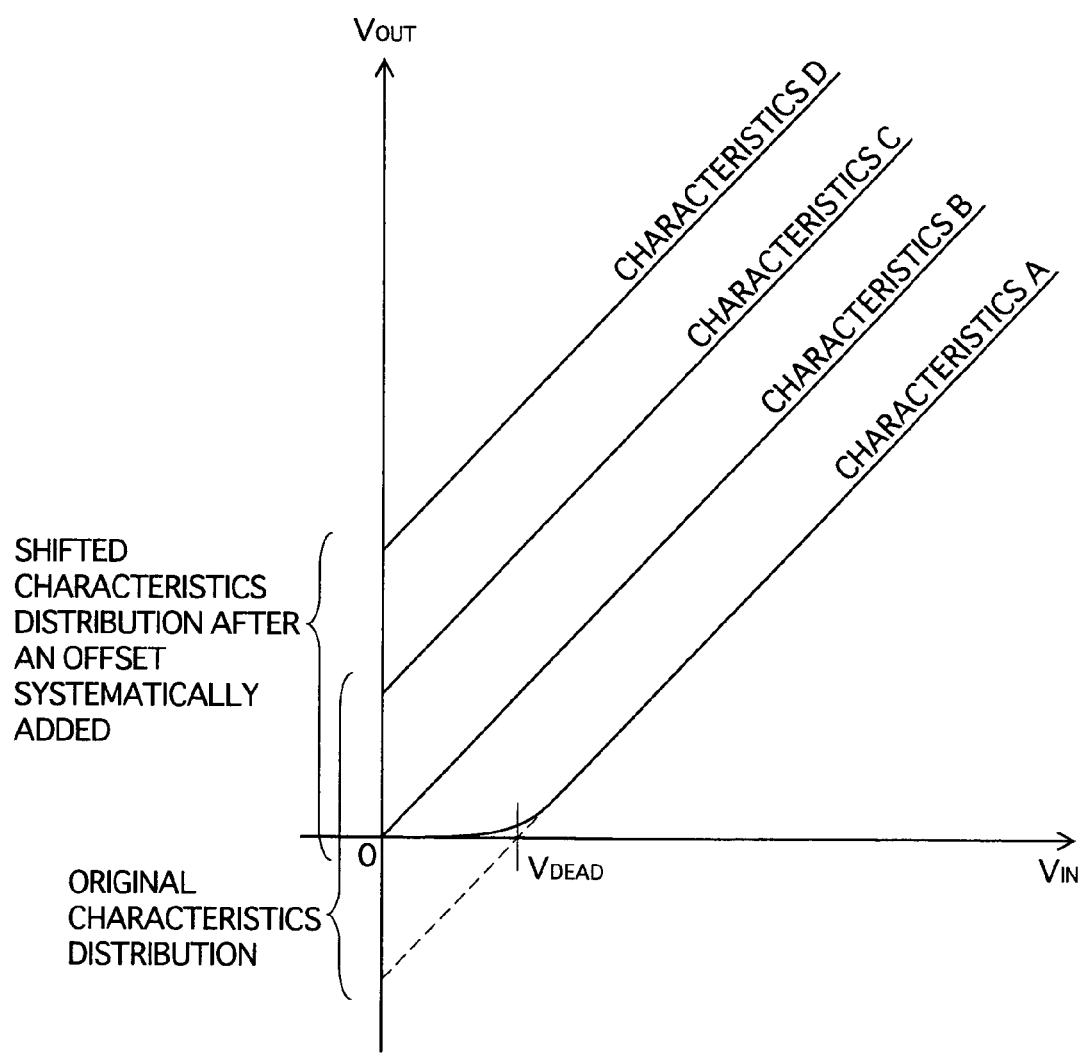
FIG. 24 is a graph showing a distribution of input-output characteristics of amplifiers.

FIG. 24 is a graph showing a distribution of input-output characteristics of amplifiers used for coil current measurement. Given that the offset of the amplifiers themselves is zero, the input-output characteristics of the amplifiers per se are distributed within the range from Characteristics A with a negative offset and Characteristics C with a positive offset, centering around Characteristics B passing through the origin. This is because the input-output characteristics are influenced by the individual differences among the amplifiers and temperature variation.

According to Characteristics A, an output $V_{OUT}$ is not obtained when an input $V_{IN}$ is less than $V_{DEAD}$. The output $V_{OUT}$ is a signal for resetting the flip-flop 5 for the PWM control and cutting off a transistor for the current chopping. If the PWM control is executed based on the coil current measured by an amplifier with Characteristics A, the transistor for the current chopping will not be cut off at least until the coil current exceeds a current corresponding to $V_{DEAD}$. In other words, the coil current cannot be controlled to be less than the current corresponding to $V_{DEAD}$.

Figure 25:
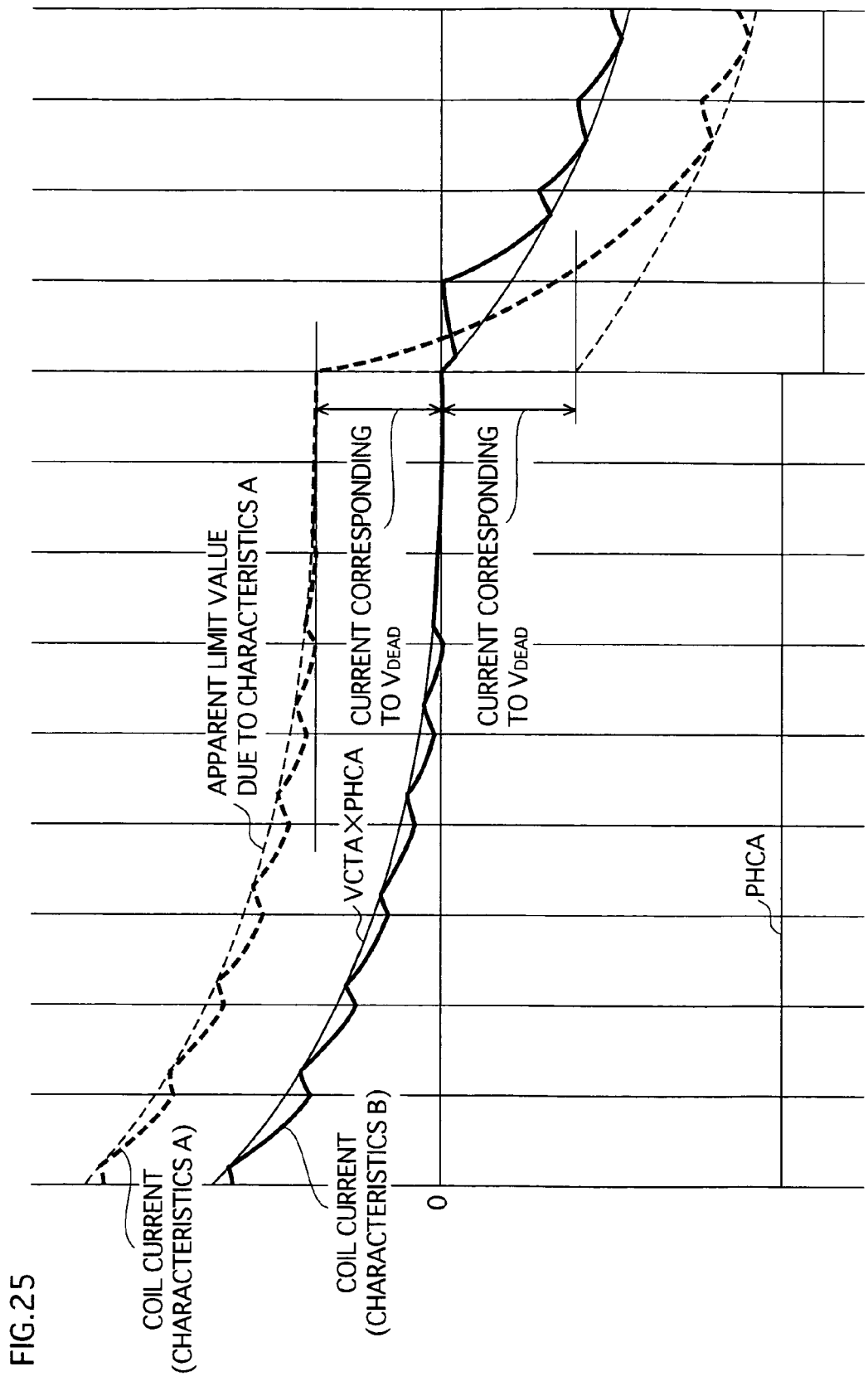
FIG. 25 is a waveform chart illustrating time changes of coil currents as determined by input-output characteristics of amplifiers used for supply current measurement.

FIG. 25 is a conceptual diagram for explaining a problem caused by this. This figure illustrates time changes of the coil currents in the cases of using amplifiers, each having Characteristics A or Characteristics B, for the coil current measurement.

In the case using an amplifier with Characteristics A, the coil current cannot be controlled to be less than the current corresponding to $V_{DEAD}$. Therefore, the coil current, as indicated by the heavy dotted line, is controlled by an apparent limit value, which is obtained by adding a limit value, represented by the reference signal VCTA, to the current corresponding to $V_{DEAD}$. In this case, the ripple factor of the coil current becomes large due to a drop arising in the apparent limit value at the time when the reference direction reverses. As a result, a reduction in vibration and noise when the motor is driven is disturbed.

On the other hand, in the case using an amplifier with Characteristics B, the output is obtained until the coil current reaches zero. Hence, the coil current, as indicated by the heavy line, is precisely controlled by the limit value represented by the reference signal VCTA. In this case, vibration and noise induced when the motor is driven can be adequately reduced.

Thus, if the distribution of the characteristics is shifted to the range of Characteristics B and D in FIG. 24 by systematically adding a positive offset to the output of the respective amplifiers, it can be avoided that amplifiers operate according to Characteristics A even under the worst conditions in individual differences among the amplifiers and temperature variation. As a result, vibration and noise induced when the motor is driven can be adequately reduced.

5.2 Modified Configuration for Adding Positive Offset

Figure 26:
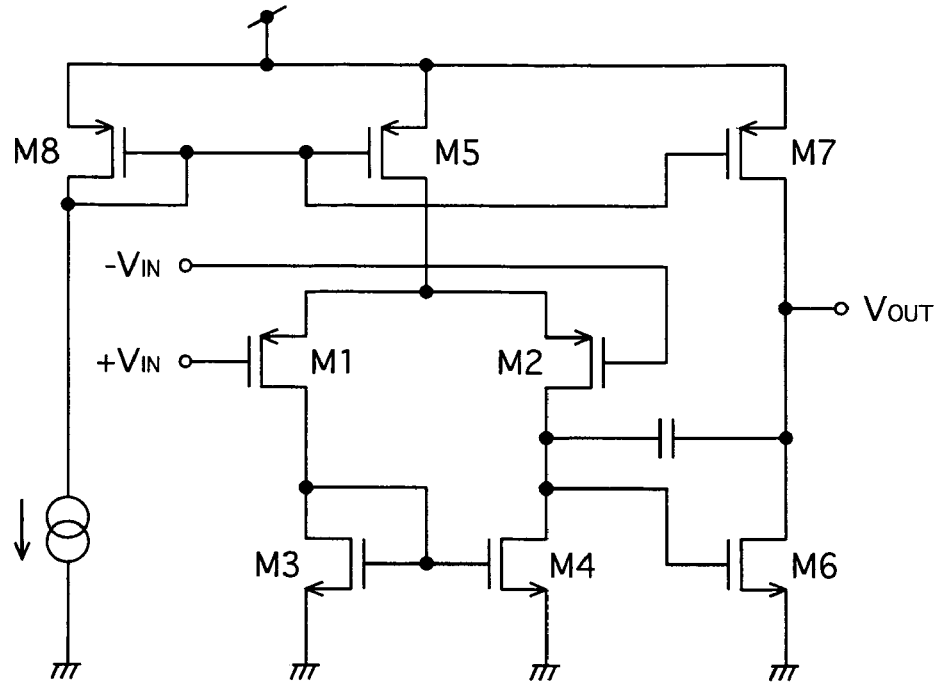
FIG. 26 is an equivalent circuit of an operational amplifier, in which a positive offset is added to the input-output characteristics.

FIG. 26 is a circuit diagram showing a different configuration for systematically adding a positive offset to the output of the amplifier. This circuit diagram exemplifies an equivalent circuit of an operational amplifier, which includes eight transistors M1–M8 as shown in the figure.

The operational amplifier is produced so that predetermined transistors among the transistors M1–M8 have a length-to-width ratio of the gates, defined by a relational expression shown in FIG. 26. Herewith, a positive offset is added to the input-output characteristics of the amplifiers per se without incorporating a constant current source and resistance.

The present invention includes a configuration in which an operational amplifier produced in the above manner is used as the amplifier for supply current measurement.

6. Sixth Embodiment

A stepping motor drive device of the sixth embodiment of the present invention differs from the fourth embodiment (see FIG. 18) in: that the stepping motor drive device receives serial data which indicates levels of individual steps of the staircase signal, generates the staircase signal based on the serial data, and generates a reference signal from the staircase signal. The following mainly describes the differences of the sixth embodiment from the fourth embodiment.

6.1 Overall Configuration

Figure 27:
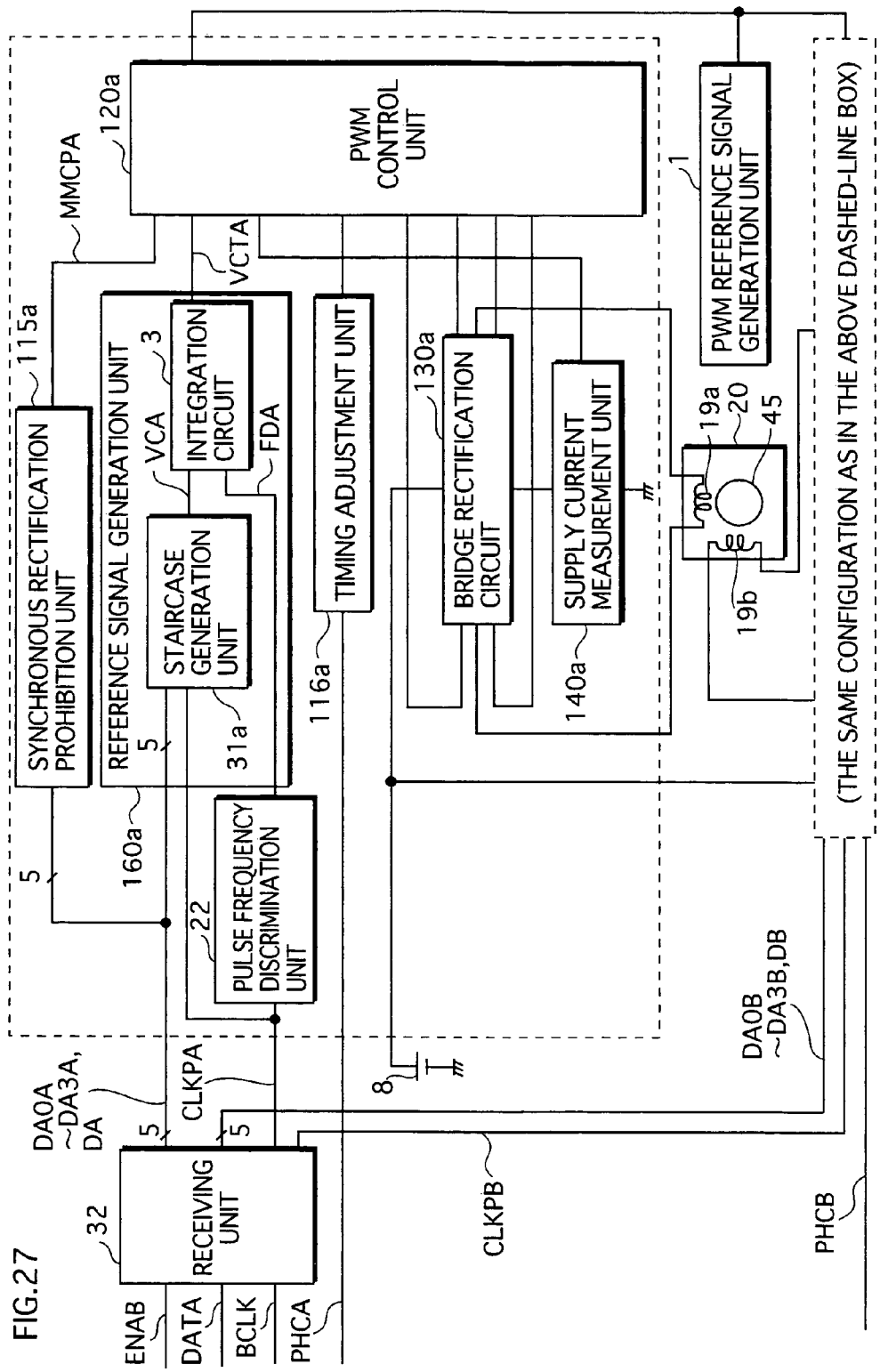
FIG. 27 is a functional block diagram showing a modification related to the staircase generation.

FIG. 27 is a functional block diagram showing an overall configuration of a stepping motor drive device according to the sixth embodiment.

The components identical to those in the fourth embodiment are given the same reference numerals or symbols, and the explanation for these components is omitted. In addition, since the same components are provided for respective coils, the following presents components for the first coil 19*a* only as a representative example, leaving out the description of components for other coils.

The stepping motor drive device is composed of a PWM reference signal generation unit 1, a receiving unit 32, a pulse frequency discrimination unit 22, a reference signal generation unit 160*a*, a SR prohibition unit 115*a*, a timing adjustment unit 116*a*, a PWM control unit 120*a*, a bridge rectification circuit 130*a*, a supply current measurement unit 140*a*, and a power supply 8.

Under the control of a unit time signal ENAB used for signal reception control and a bit sync signal BCLK, the receiving unit 32 receives serial data DATA indicating the levels of individual steps of the staircase signal with respect to each coil. Then, the receiving unit 32 converts the received serial data DATA into parallel data. In addition, the receiving unit 32 generates a clock signal providing one pulse per step of the staircase signal, and provides the clock signal and the parallel data to the reference signal generation unit 160*a* corresponding to the coil.

The staircase generation unit 31*a* in the reference signal generation unit 160*a* is configured by taking off the change rate switch unit, the up-down counter and the ROM from the staircase generation unit 2. Thus, the staircase generation unit 31*a* is practically a D/A converter. Being provided, from the receiving unit 32, with the parallel data indicating the levels of individual steps of the staircase signal, the staircase generation unit 31*a* performs a digital-to-analog conversion on the parallel data with respect to each pulse per step of the staircase signal, and generates the staircase signal VCA.

6.2 Serial Data

Figure 28:
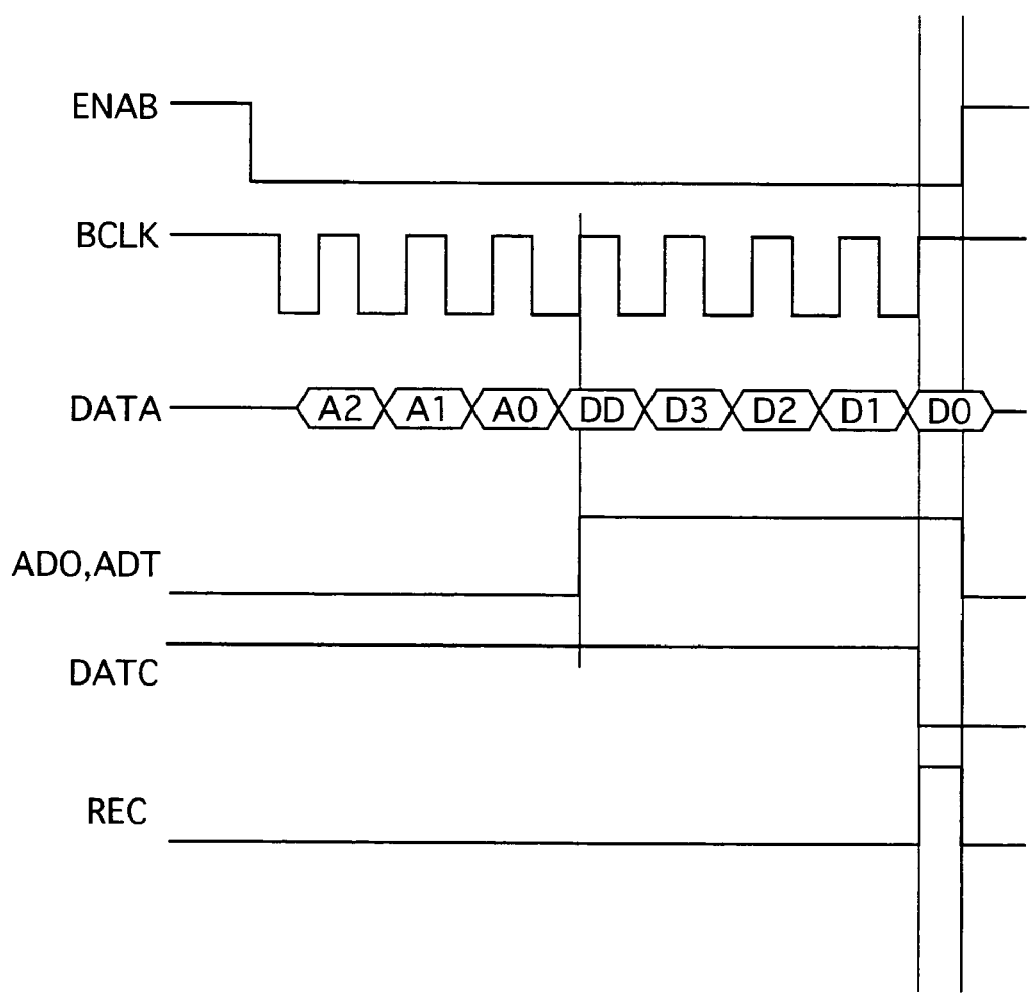
FIG. 28 is a waveform chart illustrating time changes of receiving signals and main signals in a receiving unit.

FIG. 28 is a timing chart showing one unit of the serial data received by the receiving unit 32. This unit corresponds to one step of the staircase signal for one coil. For individual coils, the serial data regarding individual steps of the staircase signal is represented in such units. The serial data is received as a series of these units.

One unit of the serial data DATA is made up of eight bits, with the first three bits for an address A2–A0 identifying a coil, the following bit of an increase/decrease direction bit SDD, and the remaining four bits for data D3–D0 showing a step level.

Note that FIG. 28 also shows time changes of main signals in the receiving unit 32, in timing with the signal reception.

6.3 Receiving Unit 32

Figure 29:
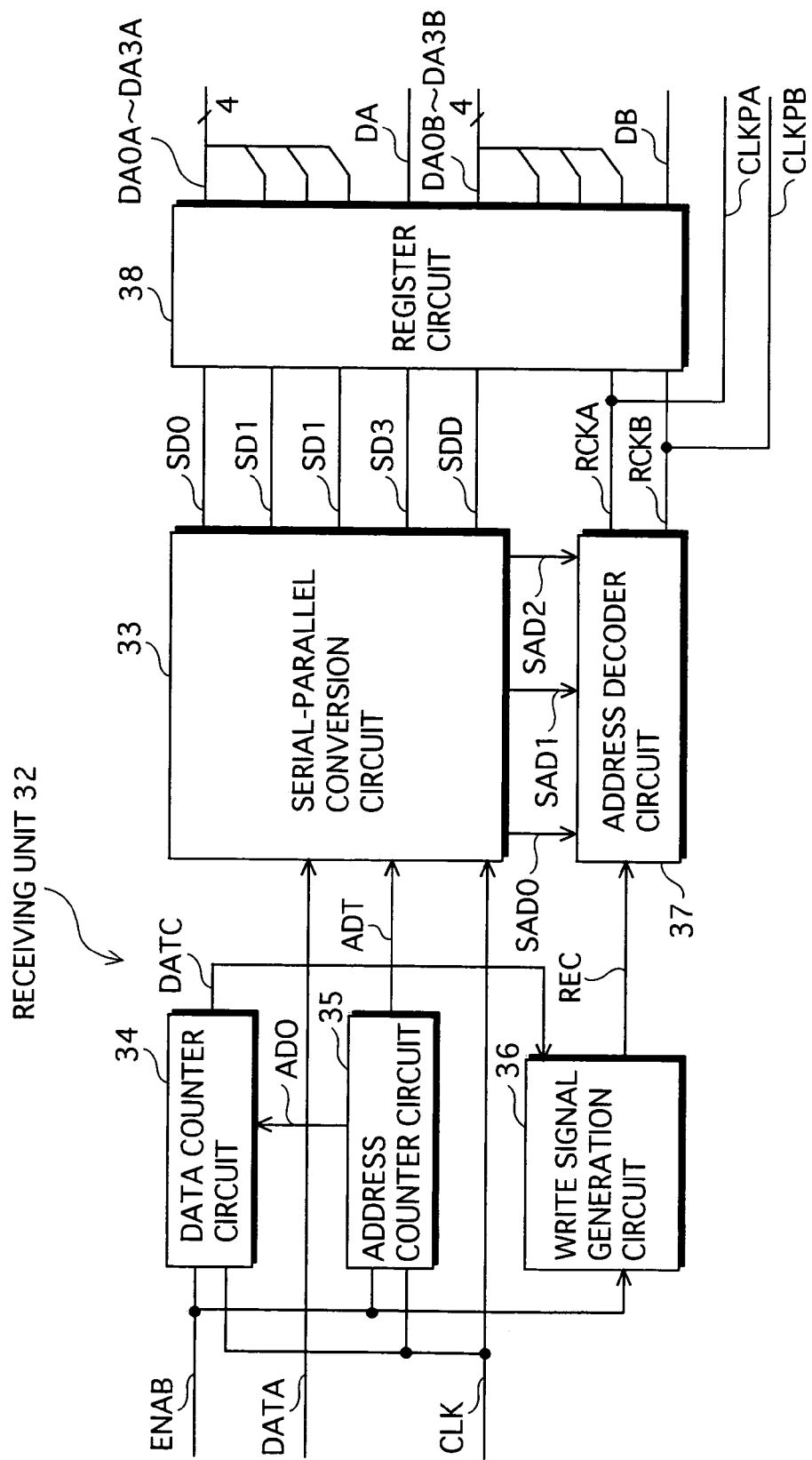
FIG. 29 is a functional block diagram showing a configuration of the receiving unit.

FIG. 29 is a functional block diagram showing a detailed configuration of the receiving unit 32. The receiving unit 32 is composed of an address counter circuit 35, a data counter circuit 34, a serial-parallel conversion circuit 33, a write signal generation circuit 36, an address decoder circuit 37, and a register circuit 38.

Figure 30:
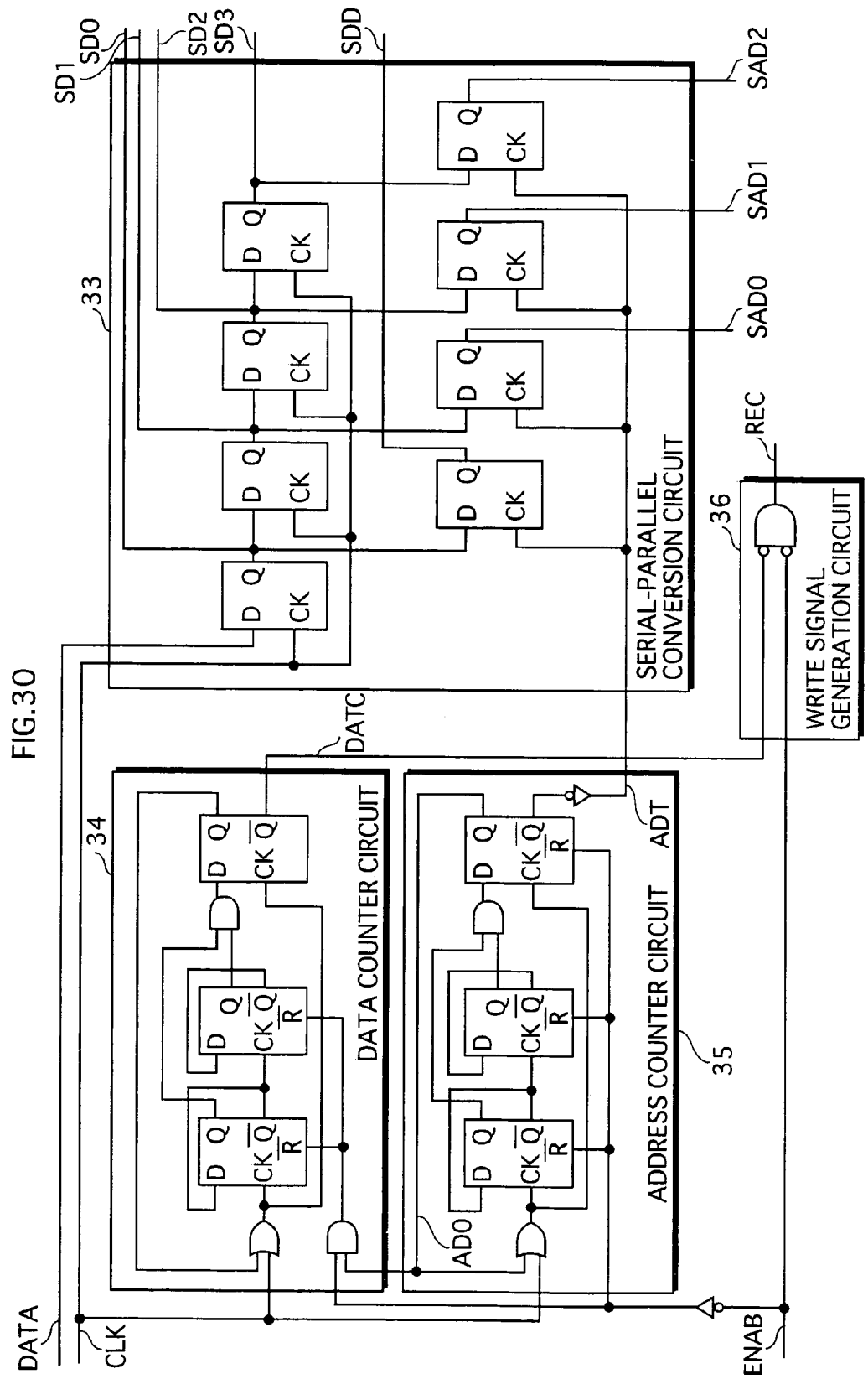
FIG. 30 is a functional block diagram showing a configuration of an address counter circuit, a data counter circuit, a serial-parallel conversion circuit, and a write signal generation circuit.

FIG. 30 is a functional block diagram showing detailed configuration of the address counter circuit 35, the data counter circuit 34, the serial-parallel conversion circuit 33, and the write signal generation circuit 36.

The address counter circuit 35 outputs address completion signals ADO and ADT by counting the first four bits of the bit sync signal BCLK for the respective units of the serial data. These address completion signals ADO and ADT indicate that the reception of the first four bits of the serial data has completed.

The data counter circuit 34 is triggered by the address completion signal ADO. The data counter circuit 34 then outputs a data completion signal DATC by counting the latter four bits of the bit sync signal BCLK. The data completion signal DATC indicates that the reception of all eight bits of the serial data DATA has completed.

The serial-parallel conversion circuit 33 converts the serial data DATA to parallel data, using a shift register which is composed of the upper four flip-flops shown in FIG. 30. Then, on the leading edge of the address completion signal ADT, the serial-parallel conversion circuit 33 latches an address SAD0–SAD2 and the increase/decrease direction bit SDD, which are included in the first four bits, into the lower four flip-flops in the figure. Hereby, the address SAD0–SAD2 and the increase/decrease direction bit SDD are separated from the data SD0–SD3, which is included in the latter four bits.

The write signal generation circuit 36 outputs a write signal REC during the period when both data completion signal DATC and unit signal ENAB are being outputted.

Figure 31:
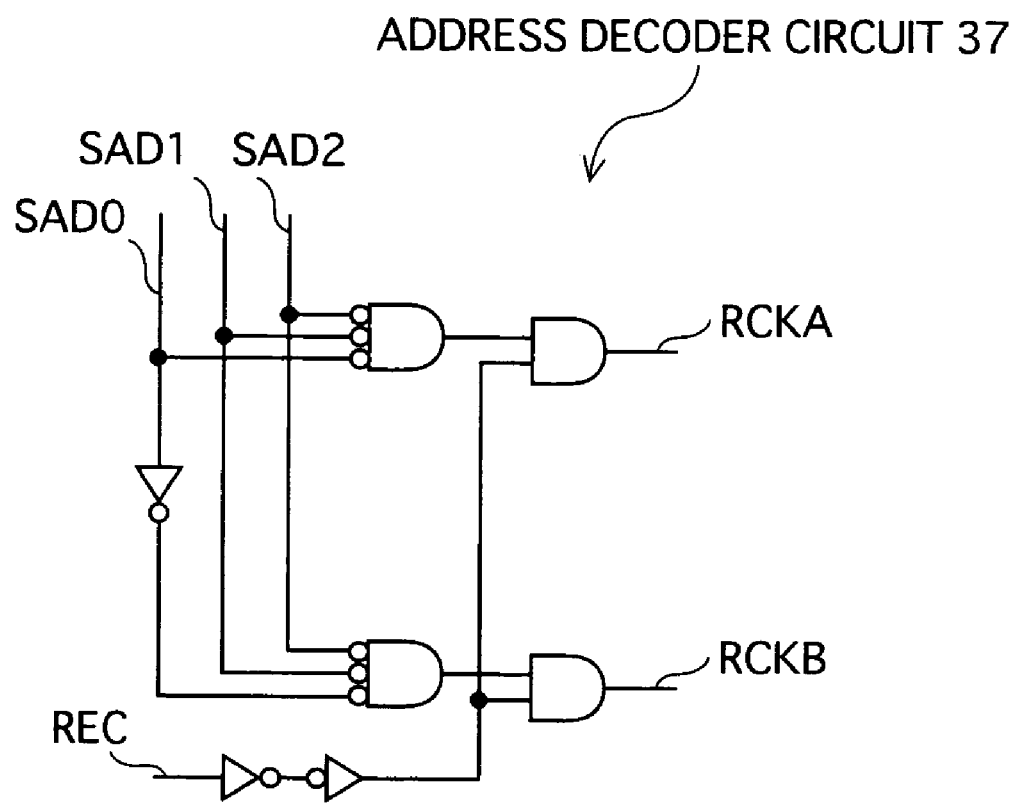
FIG. 31 is a functional block diagram showing a configuration of an address decoder circuit.

FIG. 31 is a functional block diagram showing a detailed configuration of the address decoder circuit 37.

The address decoder circuit 37 generates signals RCKA and RCKB, which instruct the register circuit 38 to store the data SD0–SD3 and the increase/decrease direction bit SDD, according to the write signal REC and the address SAD0–SAD2. The signal RCKA is also used as a clock signal CLKPA while the signal RCKB is used as a clock signal CLKPB. These clock signals CLKPA and CLKPB respectively provide one pulse per step of the staircase signal for individual coils.

Figure 32:
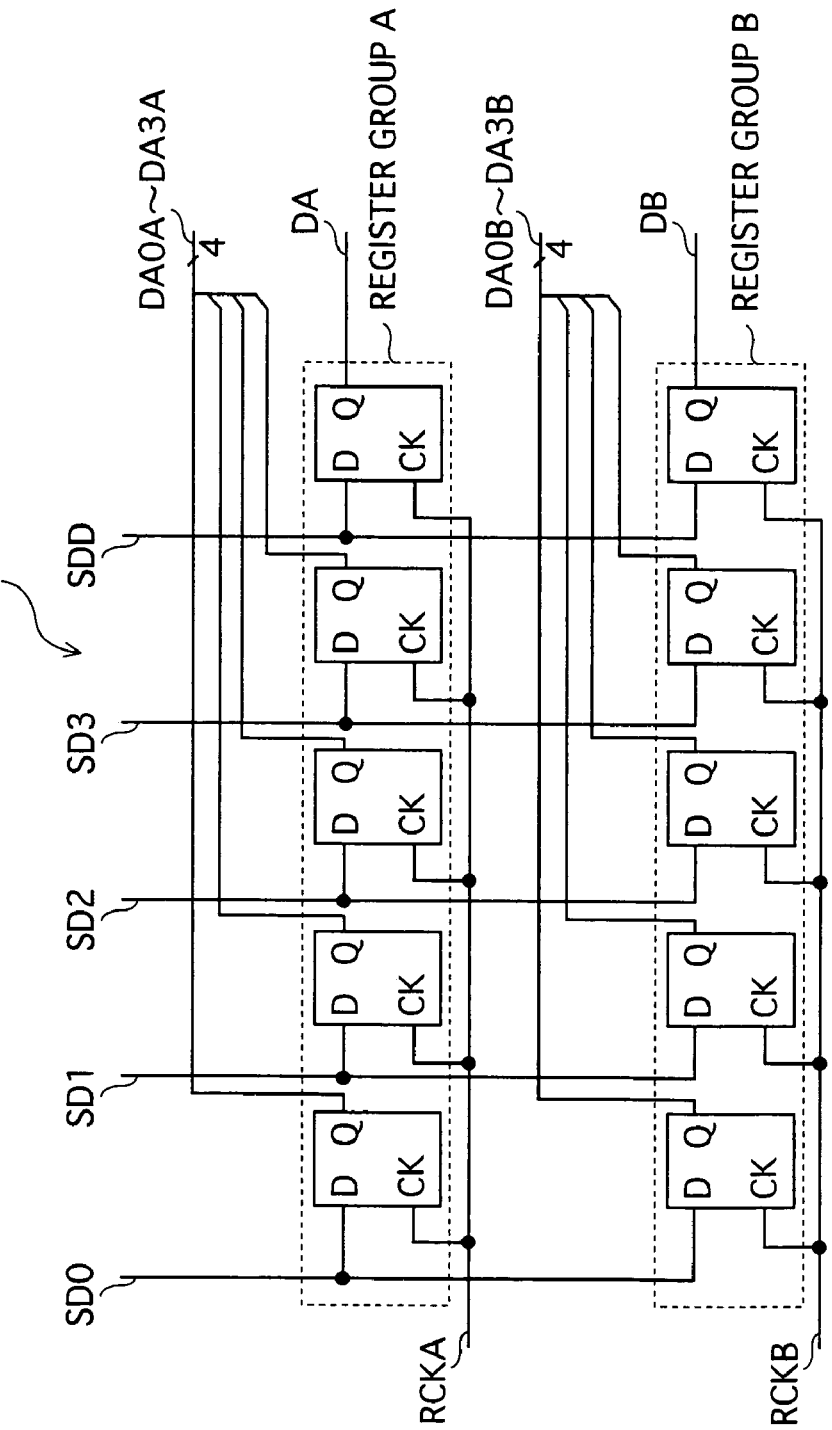
FIG. 32 is a functional block diagram showing a configuration of a register circuit.
Figure 33:
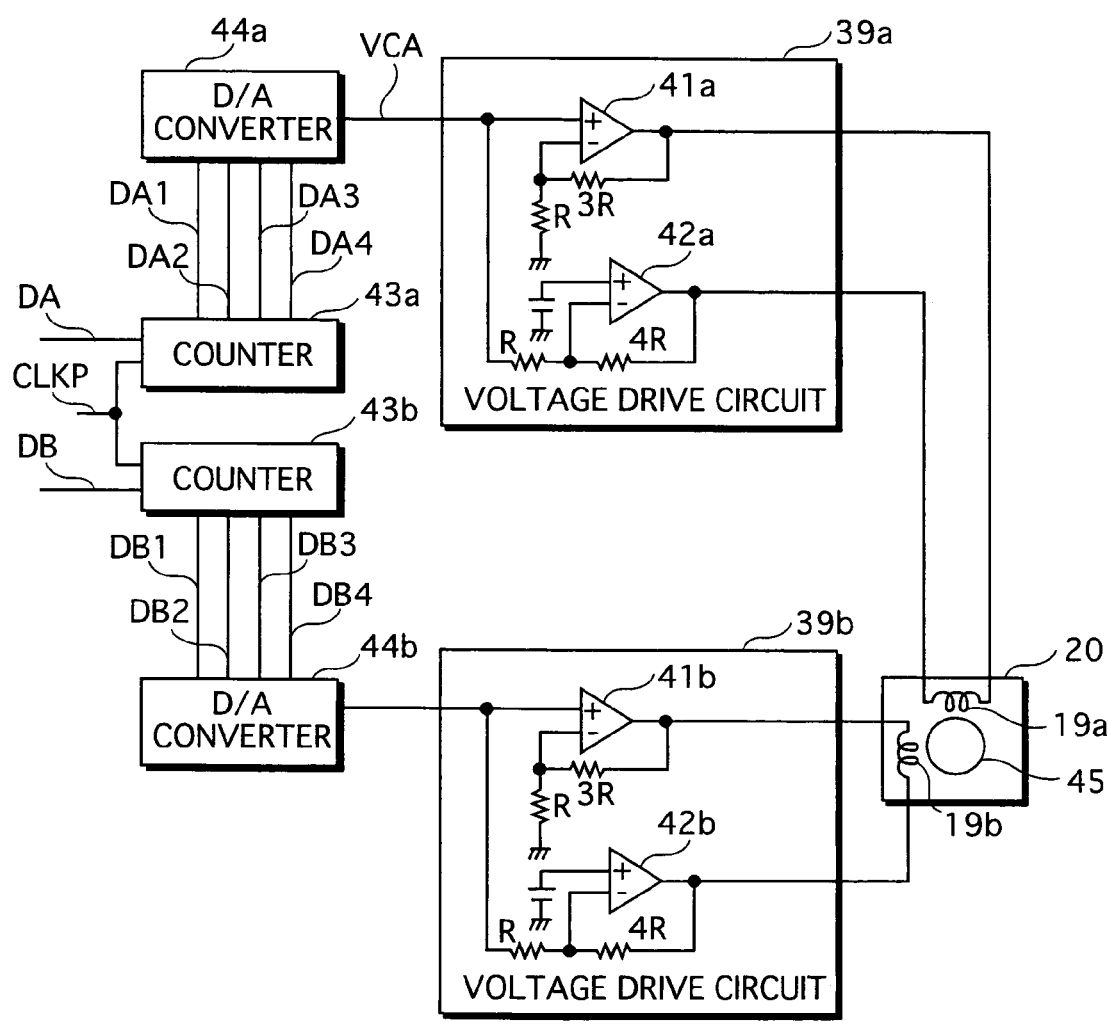
FIG. 33 is a functional block diagram showing a configuration of a conventional stepping motor drive device.

FIG. 32 is a functional block diagram showing a detailed configuration of the register circuit 38.

The register circuit 38 has five-bit register groups A and B respectively corresponding to the first coil 19a and the second coil 19b. Upon receiving the signal RCKA, the register circuit 38 stores the data SD0–SD3 and the increase/decrease direction bit SDD into the register group A, and outputs these as five-bit parallel signal DA0A–DA3A and DA. Upon receiving the signal RCKB, the register circuit 38 stores data SD0–SD3 and the increase/decrease direction bit SDD into the register group B, and outputs these as five-bit parallel signal DA0B–DA3B and DB.

Then, the staircase generation unit 31a generates the staircase signal VCA by performing a digital-to-analog conversion on the parallel data DA0A–DA3A with respect to each pulse per step of the staircase signal, which is indicated by the clock signal CLKPA.

Individual step levels of the staircase signal VCA in this case are indicated by the serial data with respect to each step. Therefore, it is possible to obtain not only an approximate sinusoidal staircase signal as exemplified in the first embodiment, but also a staircase signal VCA approximating any waveform.

7. Other Modifications

The present invention has been described according to the above embodiments. However it is apparent that the present invention is not confined to these embodiments, and the following cases are also included in the present invention.

<1> The present invention includes stepping motor drive methods in which the stepping motor drive devices described in the above embodiments are used. These methods may be achieved by a computer program which is executed by a computer system, or may be achieved by a digital signal representing the computer program.

The present invention may also be achieved by a computer-readable storage medium, such as a flexible disk, a hard disk, a CD (Compact Disc), an MO (Magneto-Optical) disc, a DVD (Digital Versatile Disc), or a semiconductor memory, on which the above-mentioned computer program or digital signal is recorded.

The present invention may also be the computer program or digital signal to be transmitted via networks, as represented by telecommunications, wire/wireless communications, and the Internet.

The computer program or digital signal may be stored into the above storage medium and transferred to an independent computer system, or alternatively, may be transferred to an independent computer system via the above network. Then, the independent computer system may execute the computer program or digital signal.

<2> In the above respective embodiments, the transistors 13 and 11 are used to perform the chopping control over the supply current. However, by using the transistors 10 and 12 instead, the same effect can be achieved on vibration and noise reduction.

<3> Although the above respective embodiments exemplify a two-phase stepping motor, the present invention is not limited to this. The present invention also includes a stepping motor with a different number of phases. A five-phase stepping motor, in which supply currents to five coils are respectively controlled using a reference signal whose level changes continuously over time, is one example of this.

<4> The first embodiment describes the case where the reference signal generation unit comprises the staircase generation unit for generating a staircase signal and the integration circuit for integrating the staircase signal in order to generate a reference signal whose level changes continuously over time. However, the internal configuration of the reference signal generation unit is not confined to this.

The present invention also includes, for example, the case in which, through the use of an analog oscillation circuit, the reference signal generation unit generates a reference signal whose level changes continuously over time.

What is claimed is:

1. A stepping motor drive device comprising:
a supply current measurement unit operable to measure a supply current supplied to a coil of a stepping motor;
a reference signal generation unit operable to generate a reference signal whose signal level changes continuously over time and which represents a limit value for the supply current;
a chopper unit operable to pass the supply current in a conducting state through thereof and stop the supply current in a non-conducting state;
a PWM control unit operable to (i) bring the chopper unit into the conducting state in a predetermined cycle, and (ii) when in each cycle the measured supply current exceeds the limit value, bring the chopper unit into the non-conducting state;

a synchronous rectification unit operable to form, in a conducting state, a closed circuit together with the coil;

a synchronous rectification control unit operable to bring, during a time period when the chopper unit is in the non-conducting state, the synchronous rectification unit into the conducting state so as to make a regenerative current from the coil circulate in the closed circuit; and a synchronous rectification prohibition unit operable to prohibit, for at least a portion of a time period during which the limit value is decreasing, the synchronous rectification control unit from bringing the synchronous rectification unit into the conducting state.

2. The stepping motor drive device of claim 1, wherein the reference signal generation unit comprises:

a staircase generation unit operable to generate a staircase signal; and an integration circuit operable to generate the reference signal by integrating the staircase signal.

3. The stepping motor drive device of claim 2, wherein the integration circuit generates the reference signal which follows an average gradient of the staircase signal by integrating the staircase signal using a time constant corresponding to a rate of change in levels of the staircase signal.

4. The stepping motor drive device of claim 3, wherein the integration circuit acquires a change rate signal indicating the rate of change in the levels of the staircase signal, and determines the time constant according to the change rate signal.

5. The stepping motor drive device of claim 3, wherein the staircase generation unit generates the staircase signal by counting a pulse signal which provides one pulse per step of the staircase signal, the stepping motor drive device further comprises:

a discrimination unit operable to discriminate a pulse frequency of the pulse signal, and the integration circuit determines the time constant based on a result of the discrimination.

6. The stepping motor drive device of claim 2, further comprising:

a receiving unit operable to receive a data signal which indicates a level of each step of the staircase signal, wherein the staircase generation unit generates the staircase signal by digital-to-analog converting the received data signal within a time period corresponding to each step.

7. The stepping motor drive device of claim 1, further comprising:

a bridge rectification circuit which includes the chopper unit, the synchronous rectification unit, and a plurality of switching units, and is operable to rectify the supply current; and a reference direction control unit operable to reverse a reference direction in which the supply current is to be managed, by bringing each of the switching units in the bridge rectification circuit into a predetermined state, the predetermined state being one of the conducting state and the non-conducting state.

8. The stepping motor drive device of claim 7, wherein the reference direction is indicated by a polarity signal, the stepping motor drive device further comprises:

a timing adjustment unit operable to delay the polarity signal for a time period required for the limit value to decrease by a predetermined amount, and the reference direction control unit reverses the reference direction according to the delayed polarity signal.

9. The stepping motor drive device of claim 8, wherein the reference signal generation unit comprises:

a staircase generation unit operable to generate a staircase signal; and an integration circuit operable to generate the reference signal by integrating the staircase signal, and the PWM control unit maintains the chopper unit in the non-conducting state during a time period when the level of the staircase signal is zero.

10. The stepping motor drive device of claim 1, wherein the supply current measurement unit is a resistor connected in series with the coil and measures the supply current using a voltage appearing across the resistor.

11. The stepping motor drive device of claim 10, wherein the resistor is a semiconductor element in a conducting state.

12. The stepping motor drive device of claim 10, wherein the supply current measurement unit outputs a measurement result which is obtained by adding a positive offset to the measured supply current, and the PWM control unit (i) brings the chopper unit into the conducting state in the predetermined cycle, and (ii) when in each cycle the measurement result exceeds the limit value, brings the chopper unit into the non-conducting state.

13. The stepping motor drive device of claim 1, wherein the stepping motor has a plurality of coils corresponding one-to-one with a plurality of phases, the supply current measurement unit measures the supply current for each of the plurality of coils, the reference signal generation unit generates the reference signal for each of the plurality of coils, the chopper unit is provided for each of the plurality of coils, and passes the supply current to each of the coils in the conducting state and stops the supply current to each of the coils in the non-conducting state, the PWM control unit, for each of the plurality of coils, (i) brings the corresponding chopper unit into the conducting state in the predetermined cycle, and (ii) when in each cycle the measured supply current exceeds the limit value, brings the corresponding chopper unit into the non-conducting state, the synchronous rectification unit is provided for each of the plurality of coils and forms individual closed circuits together with the corresponding coils in the conducting state, the synchronous rectification control unit controls, for each of the plurality of coils, the corresponding synchronous rectification unit so as to make the regenerative current from the coil circulate in the corresponding closed circuit, and the synchronous rectification prohibition unit prohibits, for each of the plurality of coils, the corresponding synchronous rectification control unit from bringing the corresponding synchronous rectification unit into the conducting state.

14. A stepping motor drive method for a drive device having a synchronous rectification unit which forms, in a conducting state, a closed circuit together with a coil included in a stepping motor, the stepping motor drive method comprising the steps of:

(a) measuring a supply current to the coil;

(b) generating a reference signal whose signal level changes continuously over time and which represents a limit value for the supply current;

(c) starting the supply current to flow to the coil in a predetermined cycle and stopping the supply current when in each cycle the measured supply current exceeds the limit value;

(d) bringing the synchronous rectification unit into a conducting state while the supply current is stopped so as to make a regenerative current from the coil circulate in the closed circuit; and (e) prohibiting the synchronous rectification unit, for at least a portion of a time period during which the limit value is decreasing, from being brought into the conducting state in the step (d).

15. The stepping motor drive method of claim 14, wherein the step (b) comprises:

a staircase generation sub-step of generating a staircase signal; and an integration sub-step of generating the reference signal by integrating the staircase signal.

16. The stepping motor drive method of claim 15, wherein the integration sub-step generates the reference signal which follows an average gradient of the staircase signal by integrating the staircase signal using a time constant corresponding to a rate of change in levels of the staircase signal.

17. The stepping motor drive method of claim 14, further comprising the steps of:

(f) acquiring a polarity signal which indicates a reference direction in which the supply current is to be managed;

(g) delaying the polarity signal for a time period required for the limit value to decrease by a predetermined amount; and (h) reversing the reference direction according to the delayed polarity signal.

18. The stepping motor drive method of claim 14, wherein the step (a) comprises:

an offset adding sub-step of adding a positive offset to the measured supply current, the step (a) takes, as a measurement result, the supply current to which the positive offset has been added, the step (c) starts the supply current to flow to the coil in the predetermined cycle and stops the supply current when in each cycle the measurement result exceeds the limit value.

* * * * *